United States Patent [19]
Jaffe et al.

[11] 3,723,718
[45] Mar. 27, 1973

[54] SIMULATION THROUGH ROTATING COORDINATE TRANSFORMATION

[75] Inventors: Richard M. Jaffe; Robert B. Parente, both of Los Angeles, Calif.

[73] Assignee: System Development Corporation, Santa Monica, Calif.

[22] Filed: Nov. 9, 1970

[21] Appl. No.: 87,931

[52] U.S. Cl. ............235/185, 235/184, 235/186, 328/132, 329/122, 331/23, 331/25
[51] Int. Cl. .................................G06g 7/62
[58] Field of Search......235/184, 185, 186, 194, 197; 329/122; 331/18, 23, 25

[56] References Cited

UNITED STATES PATENTS

| | | | |
|---|---|---|---|
| 3,564,434 | 2/1971 | Camenzind et al. | 329/122 |
| 3,393,380 | 7/1968 | Webb | 329/122 X |
| 3,517,268 | 6/1970 | Webb | 329/122 |
| 3,465,258 | 2/1969 | Wheatley | 329/122 |
| 3,189,825 | 6/1965 | Lahti et al. | 329/122 X |
| 3,204,185 | 8/1965 | Robinson | 329/122 X |
| 3,209,271 | 9/1965 | Smith | 329/122 |
| 3,358,240 | 12/1967 | McKay | 329/122 |
| 3,482,086 | 12/1969 | Caswell | 235/186 |
| 3,537,017 | 10/1970 | Judge | 329/122 |
| 3,222,654 | 12/1965 | Widrow et al. | 235/194 X |

OTHER PUBLICATIONS

Corless et al.: An experimental electronic power-system Simulator. IEE Proceedings Vol. 105 No. 23 Part A p. 503/511.

*Primary Examiner*—Felix D. Gruber
*Attorney*—Lyon & Lyon

[57] ABSTRACT

There is disclosed herein novel simulation of power system components, and particularly the simulation of a rotating electrical machine, such as a synchronous alternator, through utilization of a rotating coordinate transformation. A new form of rotating coordinate transformer is disclosed for calculating the transformation of coordinates between a primary and a secondary reference frame which rotate relative to each other and at least one of which rotates with respect to a fixed reference frame. A new method for simulating the dynamic electromechanical behavioral characteristics of a rotating electrical machine, such as an alternator, a synchronous motor, induction machine, and the like, is disclosed, as well as a new use of a phase-locked-loop in simulating such characteristics of a rotating machine. The behavioral characteristics are the electromechanical response of the machine as a function of electrical and mechanical inputs thereto and the parameters of the machine. An exemplary simulation is disclosed employing a coordinate transformer in the form of a modulated oscillator circuit, such as a voltage controlled oscillator, and a demodulator circuit, such as a phase detector. Feedback may be employed with these circuits to form one or more phase-locked-loops. A new simulation system is disclosed, as well as a method for simulating the rotation of the rotor of an electrical machine. Also a method for simulating the reference of a stator electrical variable of the machine to the rotor thereof or visa versa is disclosed. Additionally, an extensive analysis of alternators and the characteristics thereof from a mathematical standpoint are disclosed.

36 Claims, 12 Drawing Figures

PATENTED MAR 27 1973 3,723,718

RICHARD M. JAFFE
ROBERT B. PARENTE
INVENTORS.

BY Lyon Lyon
ATTORNEYS

RICHARD M. JAFFE
ROBERT B. PARENTE
INVENTORS

BY Lyon+Lyon
ATTORNEYS

RICHARD M. JAFFE
ROBERT B. PARENTE
INVENTORS

BY Lyon & Lyon
ATTORNEYS

SIMULATION THROUGH ROTATING COORDINATE TRANSFORMATION

BACKGROUND OF THE INVENTION

The present invention relates to electric power systems, and more particularly to simulation of rotation machinery employed therein under various normal and abnormal conditions.

Although the present concepts are believed to be applicable in the implementation of a wide class of rotating coordinate transformations utilized in rotating machinery analyses and simulations, typified by the Park Transform, including ac machines of both synchronous and asynchronous type for balanced or unbalanced operation, selsyns, autosyns and other control or power devices, and commutator ac and dc machines, the discussion herein will be directed particularly to the simulation of a synchronous alternator as exemplary of an application of the present concepts. Furthermore, an exemplary embodiment of the present concepts employs a modulated oscillator, such as either a frequency modulated oscillator or a phase modulated oscillator and, in a preferred embodiment, a voltage controlled oscillator (VCO), i.e. a frequency modulated oscillator whose frequency is controlled by an applied voltage, along with a demodulator, such as a phase or frequency demodulator or detector, with both the oscillator and demodulator included in a circuit or device which is termed herein a rotating coordinate transformer and which may be included in a phase-locked-loop. Various combinations of these circuits and alternative equivalent devices may be employed without departing from the present concepts. Before embarking upon a brief, and then extensive, discussion of the present concepts, the background of the problem to be solved thereby will be discussed.

For a considerable period of time, electric power companies have been concerned with the problem of transients in their networks. The advent of the Great Northeast Blackout of 1965 significantly increased this concern. In order to better understand the problem, the following four factors should be considered. First, electric power networks include a multitude of interconnected alternators busses, lines, transformers, circuit breakers and loads. From the point of view of control theory, each network can be viewed as a maze of interconnected, underdamped, non-linear servos. In fact, as frequently noted, a power network can be considered to be one of the most complex control systems for which analysis has ever been attempted. Second, because of the highly complex interconnected nature of a power system, faults (or latent system instabilities) can cause the system to experience oscillations characterized by excessively high power (or current) transients. Third, these transients can have serious, adverse effects upon system performance. For example, transient powers (or currents) which instantaneously exceed the prespecified thresholds of sensing relays can cause these relays to open circuit breakers in an effort to protect the system from damage. However, once a circuit breaker opens (thereby disconnecting a line or an alternator), additional strain may be imposed upon the rest of the system thereby causing other sensing relays to open other circuit breakers, and so forth. Thus, transients may cause a domino-like sequence of circuit breaker openings to propagate through the system, culminating in a catastrophic blackout. Finally, it should be noted that even if transients do not cause catastrophic blackouts, they may nevertheless cause partial blackouts and damage highly expensive circuit breakers and other components. It is therefore clear that, in order to avoid partial blackouts and damage to expensive components, and even more importantly to avoid catastrophic blackouts, a method for coping with the transients that may occur is needed by power companies for their systems.

There are several methods by which power companies might be able to cope with transients. The systems could be designed to be relatively immune to the transients caused by isolated faults. More specifically, before a proposed system is actually constructed, a power company could simulate the transient response of the system to isolated faults, and if necessary change the system design so as to make the final system less susceptible to such faults.

The power companies could supply their dispatchers with a continuously updated contingency table. This table would tell the dispatcher what action he should take in the event that any one of a number of possible emergencies (e.g., a fault) should occur. The contingency table would be updated frequently (perhaps every minute), so as to indicate the most appropriate dispatcher action, given the particular steady-state operating condition of the system at that time.

The power companies could supply their dispatchers with a device which would aid the dispatchers in deciding whether to allow a line to be dropped for maintenance purposes. Maintenance must be performed frequently, yet the act of dropping a line has the possibility of rendering the system more susceptible to the effects of harmful transients. If each dispatcher had equipment which could simulate the effects of the proposed line dropping on the system (with the simulated system initialized to the power flows actually occurring in the system at that time), then he could simulate the effects of the line dropping in conjunction with each one of a number of possible emergencies. If the simulation indicated that the proposed line dropping would cause no adverse effects upon system performance, then and only then, the dispatcher would give his permission for the actual line to be dropped.

Lastly, the power companies could install an on-line device which would predict the future performance of the system by extrapolation from the past performance of the system. The device would essentially involve a faster than real time simulator for the entire system. This simulator could be initialized frequently (e.g., every 10 seconds) to the parameter values of the actual system, and by virtue of its faster than real time capability, the simulator could extrapolate the system performance into the future, thereby predicting the effects of burgeoning transients. If the transients were predicted to cause harmful effects, additional circuitry could be used to take appropriate action (e.g. brake an alternator, drop a load, etc.) to avoid having these harmful effects occur in the actual system.

Each of the above listed methods of coping with transients could be implemented through the use of a simulation device which would accurately reproduce the operational characteristics of an electric power network in faster than real time. Present simulation devices either sacrifice gross amounts of accuracy in order to operate in faster than real time, or retain accuracy but operate much slower (e.g. 1000 times) than real time.

A simulation device of this nature could be used to simulate the transient response of proposed systems to isolated faults, by rapidly investigating the transients which would occur for a great many of the astronomical number of combinations of fault locations with different power flows in the system. This device could be used to calculate continuously updated contingency tables by being initialized with the particular set of power flows occurring in he system at that time, and continually simulating a preprogrammed sequence of faults. If the simulation indicated that a particular fault would cause a damaging transient, preprogrammed auxiliary circuitry would simulate a number of different protective measures (e.g. alternator braking) which could possibly mitigate the transient effects, and the simulation would be repeated for each of these protective measures until it was clear which protective measure was appropriate. The appropriate protective measures for each potentially damaging fault would then be presented to the dispatcher in the form of a contingency table.

Furthermore, this simulation device could clearly aid the dispatchers in making a decision about dropping a line for maintenance purposes, by providing a means for rapid simulation of the effects of the proposed line dropping. Finally, this device could operate sufficiently fast to extrapolate the past system performance so as to predict the future effects of burgeoning transients.

Although the usefulness of a faster than real time accurate simulation of a complete power system will be apparent from the foregoing, such a simulation has not heretofore been available. Conceptually, there are two basic techniques which could be used to mechanize the simulation, digital computation or analog computation. Digital computer simulations can provide the capability for accurate simulation of a power system, but because of the immense complexity of the set of equations which must be solved, digital simulations require exorbitant amounts of time to operate. As an example, a typical modern digital simulation of a 500-alternator system may require four hours of computation time in order to simulate ten seconds of real time.

On the other hand, analog simulations, while theoretically capable of operating much faster than real time, have required an awesome number of extremely complicated electronic devices in order to mechanize an accurate simulation of a realistically sized power system. However, close examination of previous analog simulations shows that the analog circuits required for simulation of the network (i.e., the lines, transformers, busses, loads, etc.) are not inordinately complicated. It is the analog simulation of an alternator which has hitherto required a plethora of complicated electronic equipment (including resolvers, function generators and a host of multipliers), and has militated against the achievement of a practical, accurate simulation of a realistically sized network.

Thus, a practical accurate faster than real time digital simulation of a complete power system has not previously been developed. A digital computer simulator could provide the requisite accuracy, but would be incapable (at least for any reasonable cost) of operating sufficiently rapidly to provide faster than real time simulation. An analog simulator could theoretically provide faster than real time operation, but previous analog simulations have been impractical to build because of the extremely complex and extensive circuitry hitherto utilized for simulating each alternator in the network.

It should also be noted that there also are well-known ac network analyzers, sometimes called plotting boards or calculating tables, which are used for computing the behavior of a power system. However, the accuracy of such computation is limited by a usual assumption of steady-state behavior and is not useful for the present simulation purposes without extensive modification toward hybrid (analog/digital) or analog simulators as discussed above.

SUMMARY OF THE INVENTION

The present invention is directed to a new, accurate and simple method and means of simulation, such as of a synchronous machine, or more particularly an alternator, to thereby make possible the practical realization of accurate, faster than real time simulation of a realistically sized power network.

Briefly, this can be accomplished through implementation of a class of rotating coordinate transformations, typified by the Park Transform, through application of modulated oscillation and demodulation. An exemplary modulated oscillator is a voltage controlled oscillator (VCO), and typical demodulation may be accomplished through phase or frequency demodulation or detection. For purposes of description, reference will be made herein to a variable frequency oscillator, such as a voltage controlled oscillator, although it is to be understood that other types of modulated oscillators may be used without departing from the spirit and scope of the present concepts. An exemplary implementation according to the present concepts employs, as noted above, the modulated oscillator such as a voltage controlled oscillator to internally generate sinusoids which are analog simulations of trigonometric functions of an angle of rotation, e.g., the rotor angle of a rotating machine. Specifically, the sinusoids generated by the oscillator are phase modulated sines and cosines, with a carrier or center frequency which is the analog of the machine's scheduled rotor speed and with a phase modulation which is the analog of the rotor's mechanical phase angle.

Part of the external input data, which is continuously supplied to the device, is a signal which is the analog of one or more of the machine's stator phase-winding variables (e.g. terminal voltage, terminal current, or flux-linkage). It is convenient to view this input signal as being both amplitude modulated, by the magnitude of that input signal, and also phase modulated, about a carrier frequency which is the analog of the machine's scheduled electrical frequency, and with a phase modulation which is the machine's electrical phase angle.

The demodulation, e.g. by phase detectors, of the input electrical-data modulated signal, relative to the internally generated mechanical-data modulated signals, yields constant or slowly varying signals which are proportional to both the amplitude of the input data and also to the sine and cosine of the relative phase angle between the reference systems, such as the relative angle between the machine's electrical and mechanical phase angles (e.g. the torque angle in a synchronous machine). These doubly-proportional signals, which are accomplished by the above demodulations, are the analogs of the components of the machine's stator phase-winding variable resolved into a set of coordinates fixed to the rotor; e.g. the so-called Park $d$, $q$-coordinate components. As is well-known, these components, together with the corresponding components on the rotor, are sufficient to determine the machine's remaining variables, e.g. voltage, currents, flux-linkages, torque. If the analog of the net accelerating rotor torque is so determined, and if said acceleration analog is used to determine the rate of change of the rotor's mechanical phase angle (or absolute phase angle) and if said determination of phase angle is applied as the phase modulation of the oscillator which internally generates the reference sinusoids for the demodulator, then the device will continually update itself and the feedback loop from the oscillator to demodulator back to oscillator can be described as a phase-locked-loop.

Before proceeding with a description of an exemplary embodiment of the present concepts, it must be pointed out that certain fundamental equations of a synchronous alternator must be available before a meaningful simulation according to the present concepts can be established. These equations are set forth subsequently and discussed in conjunction with an exemplary simulation system. In order to provide a more complete understanding of these concepts embodied herein, a detailed analysis of a particular two-pole three-phase synchronous alternator model also is given in an appendix along with a derivation of the equations following the description of an exemplary simulation system. An understanding of such model and equations is helpful, but has been placed last herein so as to enable a discussion of the present concepts first without the necessity of wading through an extensive mathematical analysis.

Hereafter, alternator and synchronous machine will be used synonymously as will alternator and model of the alternator.

The machine model analyzed and used in the simulation has been chosen for three reasons: (1) the model is a well-known and accepted model for a synchronous machine; (2) for the class of transients of particular interest, it is sufficiently complex to illustrate the techniques used in analyzing machine behavior and the importance of the novel features contained in this application; and (3) it is a model used in prior digital simulations and, therefore, simulation accuracy may be checked readily. The detailed analysis presented here is designed to illustrate a usual philosophy in rotating machine analysis — namely, the use of coordinate transforms and differing frames of reference. The complexity of the model is therefore of minor interest insofar as the novel features of the simulation are concerned.

The coordinate transformer disclosed herein is applicable to rotating electric machines in general and, with the addition of feedback, the coordinate transformer creates a phase-locked-loop in its simulation of rotating electric machines. The preferred embodiment, given below, is directed to two types of machines: synchronous machines (either an alternator or a motor), and induction machines. However, it is not intended that the presentation of the present preferred embodiment should imply a limitation of coverage of other rotating machines.

Accordingly, it is a principal object of this invention to provide an improved method of simulation.

Another object of this invention is to enable the improved simulation of a rotating machine, such as an alternator.

A further object of this invention is to provide a novel system of simulation.

An additional object of this invention is to enable improved simulation of an alternator or the like through the use of a modulated oscillator and phase detector means.

Another object of this invention is to provide a novel simulation employing a phase-locked-loop.

A further object of this invention is to provide a novel implementation of a rotating coordinate transformation.

These and other objects and features of the present invention will become better understood through a consideration of the following description taken in conjunction with the drawings.

PRELIMINARY DESCRIPTION OF CONCEPTS

Rotating Coordinate Transformer

The basic concepts of the invention disclosed herein involves a method and apparatus for implementing, by means of modulated oscillator means and demodulator means, such as a phase or frequency demodulator or detector (PFDD) and either a frequency modulated oscillator (FMO) or a phase modulated oscillator (PMO), a rotational transformation of coordinates, which is useful in its application to rotating electrical machines.

A. Rotating Reference Frames

Figure 1:
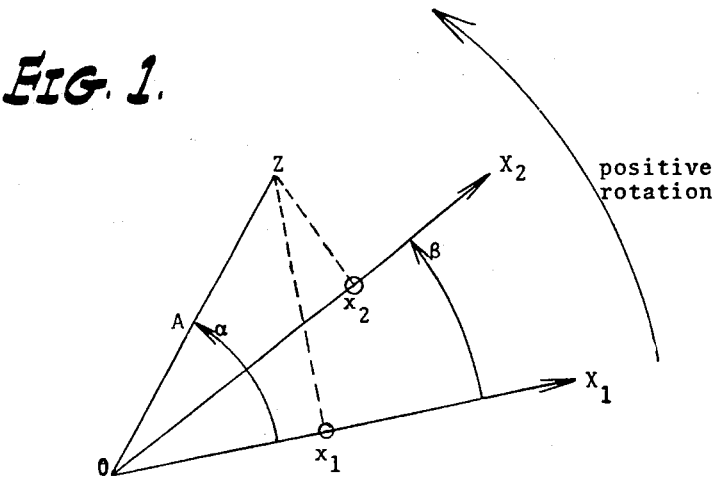
FIGS. 1 through 3 are respectively a vector diagram, circuit diagram, and vector diagram used to illustrate the basic concepts of the present invention.

The equations which express the behavior of a rotating electrical machine can be simplified by a transformation of coordinates which is associated with rotating reference frames. FIG. 1 is an illustration of rotating reference frames: a primary abscissa axis, $OX_1$, a secondary abscissa axis, $OX_2$, and a vector, $OZ$, all share a common point of origin, O. In FIG. 1, the positive direction of rotation shall be taken as the counter-clockwise (c-c-w) direction about 0. In addition to the two abscissa axes, there are assumed to be two ordinate axes, $OY_1$ and $OY_2$ (omitted in FIG. 1 in order to simplify that diagram), each rotated +90° in advance to their corresponding abscissa axes, $OX_1$ and $OX_2$ respectively. The coordinates (abscissa, ordinate) of the tip of vector OZ can be specified in either the primary reference frame $OX_1-OY_1$ or the secondary reference frame $OX_2-OY_2$. We shall be concerned with the transformation of those coordinates from the primary reference frame to the secondary reference frame due to a relative rotation between these reference frames.

The vector, OZ, can be specified by both its amplitude (length), A, which might vary with time, and its angle of rotation, $\alpha$, relative to the primary abscissa axis, $OX_1$. Relative to axis $OX_1$, let the vector, OZ, have a normal or average rotational speed, which is the constant $\omega_1$, and a phase angle, $\phi_1$, such that the vector's angle of rotation, $\alpha$, can be written as a function of time, $t$, by equation (a) below:

$$\alpha = \omega_1 t + \phi_1. \tag{a}$$

A positive value for phase angle $\phi_1$ indicates that vector OZ is rotated c-c-w in advance of its normal rotation; a zero value indicates that the vector is at its normal rotation; a negative value indicates that the vector is retarded behind its normal rotation.

On the basis of Equation (a) above, the instantaneous rotational speed of vector OZ, relative to the primary reference frame, is as given by equation (b) below:

$$d\alpha/dt = \omega_1 + d\phi_1/dt. \tag{b}$$

Thus the vector's rotational speed, relative to the primary reference frame, at some particular instant of time, may be more than, equal to, or less than its normal or average rotational speed, $\omega_1$, depending upon whether the rate of change of phase angle $\phi_1$ is positive, zero, or negative at that particular instant in time.

The secondary abscissa axis, $OX_2$, is specified by its angle of rotation, $\beta$, relative to the primary coordinate axis, $OX_1$, as is illustrated in FIG. 1. Relative to the primary abscissa axis, $OX_1$, let the secondary abscissa axis, $OX_2$, have a normal or average rotational speed, which is the constant $\omega_2$, and a phase angle, $\phi_2$, such that the rotation angle, $\beta$, can be written as a function of time by equation (c) below:

$$\beta = \omega_2 t + \phi_2. \tag{c}$$

A positive value of phase angle $\phi_2$ indicates that the secondary reference frame is rotated c-c-w in advance of its normal rotation; a zero value indicates that the secondary frame is at its normal rotation; a negative value indicates that the secondary frame is retarded behind its normal rotation.

On the basis of equation (c) above, the instantaneous rotational speed of the secondary reference frame, relative to the primary reference frame, is as given by equation (d) below:

$$d\beta/dt = \omega_2 + d\phi_2/dt. \tag{d}$$

Thus the rotational speed of the secondary reference frame, relative to the primary reference frame, at some particular instant of time, may be more than, equal to, or less than its normal or average rotational speed, $\omega_2$, depending upon whether the rate of change of phase angle $\phi_2$ is positive, zero, or negative at that particular instant in time.

With the aid of FIG. 1 and equation (a) above, observe that the $OX_1$ component of vector OZ, i.e., the primary reference frame's abscissa, $x_1$, can be written as equation (e) below:

$$\begin{aligned} x_1 &= A \cos(\alpha), \\ &= A \cos(\omega_1 t + \phi_1). \end{aligned} \tag{e}$$

With the aid of FIG. 1, and equations (a) and (c) above, observe that the $OX_2$ component of vector OZ, i.e., the secondary reference frame's abscissa, $x_2$, can be written as equation (f) below:

$$\begin{aligned} x_2 &= A \cos(\alpha - \beta), \\ &= A \cos([\omega_1 - \omega_2]t + [\phi_1 - \phi_2]). \end{aligned} \tag{f}$$

Both equations (e) and (f) above express the abscissa of the same rotating vector, OZ, with respect to one of the reference frames; similar expressions could have been written for the corresponding ordinates, $y_1$ and $y_2$, but are omitted for the sake of brevity.

We shall now present a means whereby the vector's coordinates in the primary reference frame can be transformed to the vector's coordinates in the secondary reference frame.

B. Coordinate Transformer

Figure 2:
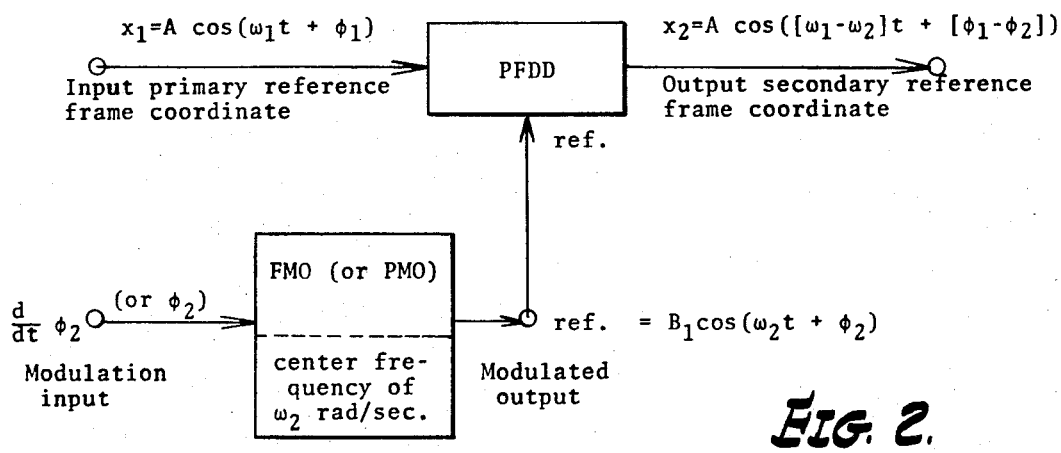

FIG. 2 illustrates an implementation, by means of a phase or frequency demodulator or detector (PFDD) and either a frequency modulated oscillator (FMO) or a phase modulated oscillator (PMO), of the transformation of coordinates between rotating reference frames. Either a FMO or a PMO, whose center or carrier frequency is the constant $\omega_2$, is used to generate a reference signal, which either is, or at least contains, the phase modulated signal, "ref." defined by equation (g) below:

$$\text{ref.} = B_1 \cos(\omega_2 t + \phi_2), \tag{g}$$

where $B_1$, in equation (g) above, is a constant. For the purposes to which the reference signal will be put, any signal whose instantaneous values are positive, zero, and negative at the same instant of time that the values of signal "ref." are positive, zero, and negative, respectively, (i.e., any signal with like polarity vs. time as signal "ref.") can be said to contain signal "ref." (An example of a signal which contains signal "ref." is a square wave whose fundamental component is proportional to "ref.") If the reference signal is generated by a FMO, then the oscillator's frequency modulation, specifically the oscillator's instantaneous departure from its center frequency, i.e., the rate of change of phase angle $\phi_2$, $d\phi_2/dt$ (cf. equation (d) above), must be provided as an input signal to the FMO. On the other hand, if the reference signal is provided by a PMO, then the oscillator's phase modulation, phase angle $\phi_2$, must be provided as an input signal to the PMO. In either case, the appropriate modulation must be applied to the oscillator so as to force its output, the reference signal, either to be or to contain signal "ref.", given by equation (g) above.

A reference signal, which either is, or at least contains, the phase modulated signal ref., given by equation (g) above, is provided as the input reference signal for a phase or frequency demodulator or detector (PFDD). The other input signal to PFDD is $x_1$, the abscissa in the primary reference frame, given by equation (e) above. This input signal is amplitude modulated by A and phase modulated by angle $\phi_1$, about its carrier frequency $\omega_1$. The demodulation of $x_1$ by the PFDD, relative to its reference signal, is either equal to or proportional to $x_2$, the abscissa in the secondary reference frame, given by equation (f) above. An example of an embodiment of the PFDD follows. If the PFDD forms a signal which is (1) signal $x_1$ during the time interval while the reference signal is positive, (2) zero while the reference is zero, and (3) the inversion (negative) of signal $x_1$ while the reference is negative, then the resultant signal so formed will contain signal $x_2$, together with other extraneous frequency components which can be removed by appropriate filtering, in order to leave signal $x_2$ as the requisite output of the PFDD.

In addition, ordinate $y_1$ can be transformed to ordinate $y_2$ by the same means as illustrated in FIG. 2, or alternatively, abscissa $x_1$ can be transformed to ordinate $y_2$ by introducing an additional +90° phase shift in the reference signal to the PFDD in order to account for the 90° c-c-w advance of the ordinate axis with respect to its abscissa axis (i.e., replace the ref. cosine with -sine in equation (g) above).

Summarizing, when the circuit arrangement illustrated in FIG. 2 is provided with primary reference frame coordinates and either phase angle $\phi_2$ or its rate or change, $d\phi_2/dt$, then the arrangement provides the transformation to secondary reference frame coordinates, where the two reference frames are in rotation with respect to each other.

C. Rotating Machines

Figure 3:
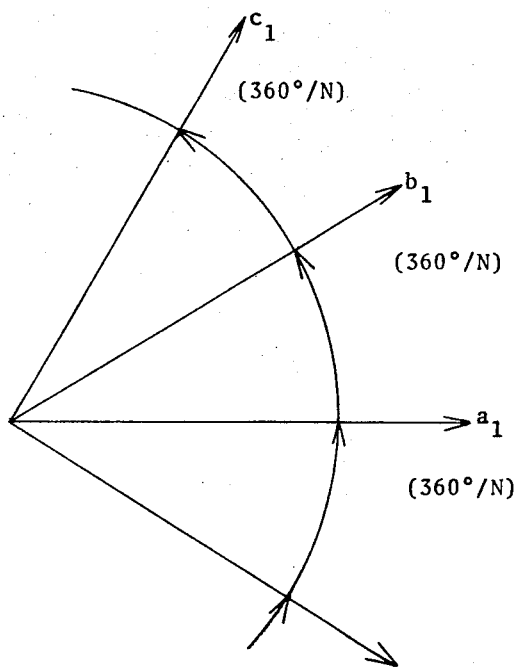

The coordinate transformer, described with respect to FIG. 2 above, is useful in its application to rotating electrical machines. As an illustration, consider FIG. 3. The primary abscissa, axes $a_1, b_1, c_1, \ldots$ represent the phase belt axes on an N-phase (where $N=3, 4, 5, \ldots$) symmetrical machine (stator or rotor, as the case may be). Thus, each of the phase belt axes are separated by 360°/N electrical degree.

Now consider N rotating vectors, associated one-to-one with each phase belt, wh-re each vector may differ in its particular amplitude, normal speed, and phase angle, but each vector's rotation is measured in electrical degrees from the primary a-phase abscissa axis, $a_1$. The abscissae of each vector's projection onto its associated phase belt axis are given by the set of equations (h) below:

$$\left.\begin{array}{l} x_{a1} = A_a \cos(\omega_{a1}t + \phi_{a1}) \\ x_{b1} = A_b \cos(\omega_{b1}t + \phi_{b1} - 360°/N) \\ x_{c1} = A_c \cos(\omega_{c1}t + \phi_{c1} - 720°/N) \\ \vdots \\ \vdots \end{array}\right\} \quad (h)$$

Those skilled in the art will recognize that the set of equations, (h) above, are typical of rotating electrical machines; if the abscissae are the magnitudes of a machine's vector quantities (e.g. magnetic field), then the rotating vectors can be associated with rotating physical vectors in that machine — if the abscissae are the values of a machine's scalar quantities (e.g. voltage, current, flux-linkage), then the rotating vectors are associated with fictitious rotating vectors in that machine. In either event, if each rotating vector has the same amplitude A, normal speed $\omega_1$, and phase angle 100 $_1$, then those skilled in the art will recognize that the set of equations (h) above, become typical of the so-called "balanced" condition of a rotating machine (stator or rotor, as the case may be). Thus "balance" implies that one unique rotating vector can be associated in common with each phase belt axis on the machine. This is a justification for the well-known technique of restricting the analysis of a balanced machine to a single representative phase belt on that machine, and extrapolating the results of said analysis to each of the machine's phase belts.

It is well known, to those skilled in the art, that the equations which characterize the behavior of a rotating electrical machine, in either the balanced or the unbalanced condition, are often simplified when both the rotor and the stator equations of the machine are transformed to a common reference frame. For example, the so-called Park Transform represents a transformation of armature reference frame machine variables to a reference frame fixed with respect to the machine's field; whereas, the inverse Park Transform is from field to armature. Specifically, consider a secondary reference frame rotating with normal speed $\omega_2$ and phase angle $\phi_2$ relative to the primary a-phase abscissa axis in FIG. 3; those rotating vectors which yielded the primary abscissae given by the set of equations, (h) above, will yield the secondary abscissae given by the set of equations (i) below:

$$\left.\begin{array}{l} x_{a2} = A_a \cos([\omega_{a1}-\omega_2]t + [\phi_{a1} - \phi_2]) \\ x_{b2} = A_b \cos([\omega_{b1}-\omega_2]t + [\phi_{b1} - \phi_2]) \\ x_{c2} = A_c \cos([\omega_{c1}-\omega_2]t + [\phi_{c1} - \phi_2]) \\ \vdots \\ \vdots \end{array}\right\} \quad (i)$$

Those skilled in the art will recognize that the set of transformed abscissae, given by (i) above, is pertinent to several different conditions in the study of rotating electrical machines. One example is where each primary reference frame abscissa represents stator variables with a common ac electrical frequency, $\omega_1$, and the secondary reference frame is fixed to the machine's rotor; then the differential frequency, $\omega_1-\omega_2$, in the set of equations (i) above, pertains to either the so-called "-slip frequency" ac variables generated in the rotor of an induction machine, or, when stator frequency, $\omega_1$, and rotor, $\omega_2$, are the same, then the disappearance of ac variation in the rotor frame pertains to the so-called "synchronous" machine.

Thus it should be clear that a transformation of coordinates by rotation is applicable to rotating machines, and that the implied transformation from the set of equations (h) above, to the set of equation (i) above, can be accomplished by the coordinate transformer, presented earlier in FIG. 2, with the sole modification being the introduction of a constant phase shift (e.g. −360°/N) in the reference signal to the PFDD to account for the location of that particular phase belt whose coordinates are to be transformed.

D. Phase-Locked-Loop

In a specific exemplary application of the coordinate transformer to a rotating electrical machine where the primary reference frame is fixed in the stator and the secondary reference frame is fixed in the rotor, then the coordinate transformer's modulation input (either the rate of change of phase angle $\phi_2$ to a FMO or the phase angle $\phi_2$ to a PMO) pertains to that machine rotor's mechanical position and can be determined as follows. As is well-known to those skilled in the art, the machine's variables (flux-linkage, current, voltage, etc.) in the secondary reference frame (rotor frame)

can be determined, in a straightforward manner, from the rotor's electrical equations and the stator's variables, once those stator variables are also transformed to the rotor frame (as can be accomplished by the present coordinate transformer). In particular, the electromechanical torque on the machine's rotor shaft can then be computed and the results of that computation, together with the mechanical equations of motion for the rotor (e.g. inertia, torque from prime mover or torque to a mechanical load), are sufficient to calculate either the rotor's instantaneous departure from normal speed (the so-called velocity deviation) or its mechanical phase angle of position relative to a normal rotation (the so-called rotor angle). But such data is the requisite modulation input for the present coordinate transformer. Thus the calculation outlined above can be performed by an analog signal processor or a digital signal processor or a hybrid signal processor, from the achieved rotor frame variables, and the results can then be fed back and applied as the modulation input to the modulated oscillator; such as a signal feedback processor loop (i.e., modulated oscillator as reference for a demodulator to signal processor — otherwise known as a loop filter — and then back to modulate the oscillator and close the loop) is well-known, to those skilled in the art, as an embodiment of a phase-locked-loop.

The above discussion has presented a brief outline of the present coordinate transformer, its application to rotating electrical machines, and an embodiment of a phase-locked-loop when a rotor reference frame is selected. The concepts shall next be presented as specifically applied to an analog simulation of a balanced synchronous machine.

DESCRIPTION OF PREFERRED EMBODIMENT

A. Introduction

Figure 4:
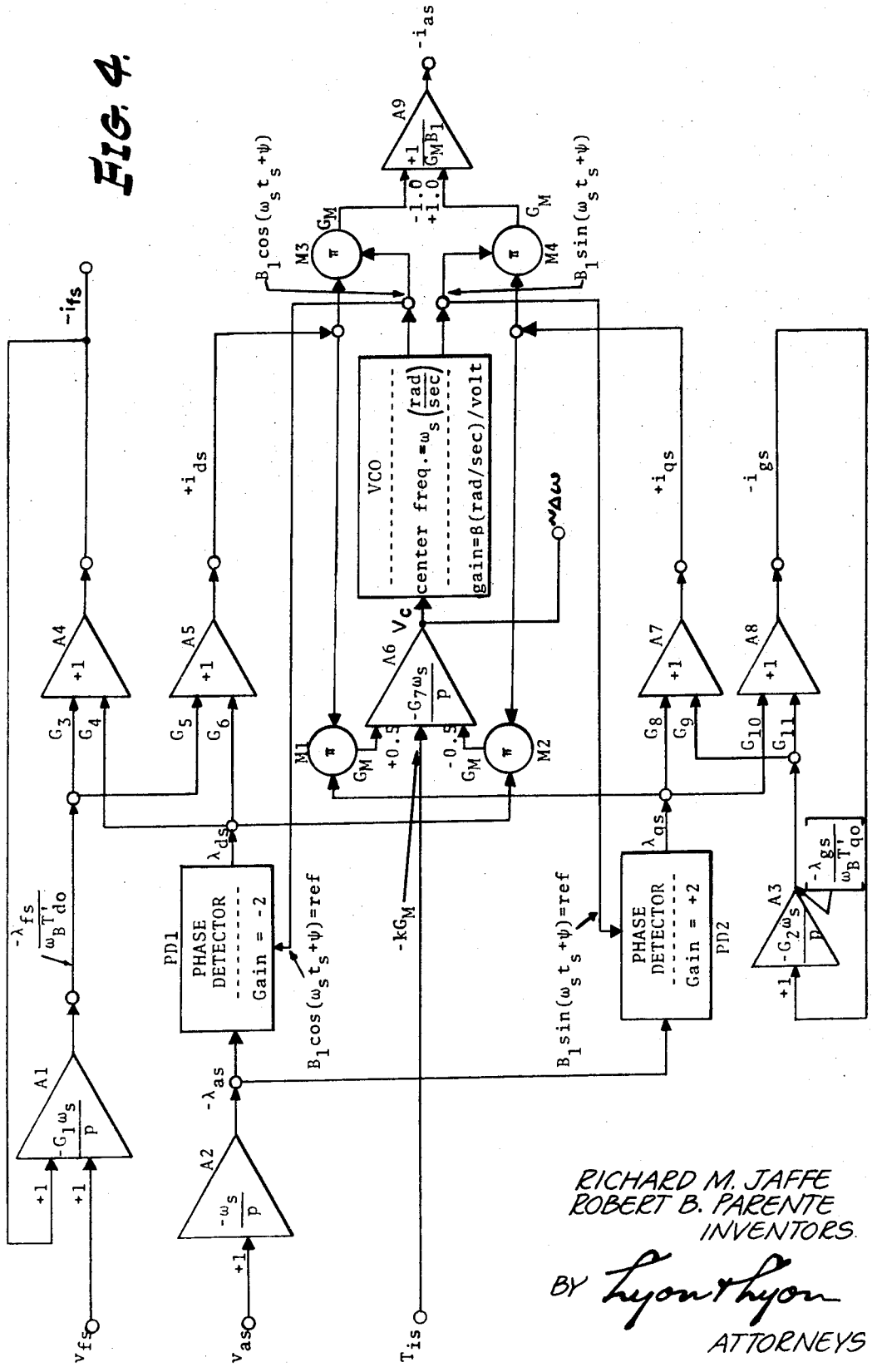
FIG. 4 is a block diagram of an exemplary simulation system for an alternator according to the present concepts.

Turning now to a description of a preferred embodiment of the present simulation concepts, FIG. 4 is a block diagram of a system for simulating the particular model of an alternator given in the Appendix. The various blocks, or subcomponents, of the system of FIG. 4 are amplifiers, integrators, multipliers, phase detectors and a modulated oscillator (e.g. a voltage controlled oscillator) which are well-known to those skilled in the art; however, each will be described in detail subsequently. The main departure of FIG. 4 from a typical analog computational circuit is the inclusion of a modulated oscillator, in the form of a voltage controlled oscillator, and phase detectors. The preferred embodiment employs a voltage controlled oscillator (VCO) and phase detectors in a configuration which is known and described by those skilled in the art by the term phase-locked-loop; more specifically, it includes two phase-locked-loops which share a common VCO. In addition to the preferred embodiment, which can be described as a phase-locked-loop, there are other embodiments of the present simulation concepts which employ two VCO's or a VCO and phase detectors in a configuration which is not necessarily described as a phase-locked-loop. As noted earlier, it has been found that a voltage controlled oscillator and phase detectors can be employed in an analog simulation in order to accurately and rapidly simulate an alternator.

B. Brief Description of FIG. 4

The diagram of FIG. 4 is a schematic for a device which combines and processes several analog voltage signals in order to produce an analog simulation for the dynamic behavior of the model of this synchronous machine assuming balanced operation. By external means, such as analog simulation circuits for the stator bus, field exciter, and prime mover to which the machine is connected, the device is continuously supplied with the three simultaneous input signals ($v_{fs}$, $v_{as}$, and $T_{is}$) which are indicated on the left-hand edge of FIG. 4. Every other signal in the device is generated by the device either directly or indirectly from the aforementioned three simultaneous input signals; thus all of the other signals are output signals.

C. Field, Stator and Amortisseur Integrators

Input signal $v_{fs}$ is the analog simulation of the field voltage which is supplied to the machine by its exciter. Output signal $-i_{fs}$ of amplifier A4 is the analog simulation of the inversion (negative) of the machine's field current. The generation of $-i_{fs}$ will be described below in section E. The linear combination of signals $v_{fs}$ and $-i_{fs}$ is the signal applied to integrator A1, causing A1 to generate output signal $-\lambda_{fs}/\omega_B T'_{do}$, which is proportional to the analog simulation of the inversion of the machine's field flux-linkage.

Input signal $v_{as}$ is the analog simulation of the terminal voltage of the a-phase of the machine's stator. Input signal $v_{as}$ is the signal applied to integrator A2, causing A2 to generate output signal $-\lambda_{as}$, which is the analog simulation of the inversion of the flux-linkage of the a-phase of the machine's stator.

Output signal $-i_{gs}$ from amplifier A8 is the analog simulation of the inversion of the machine's amortisseur current. The generation of $-i_{gs}$ will be described below in section E. Output signal $-i_{gs}$ is the signal applied to integrator A3, causing A3 to generate output signal $-\lambda_{gs}/\omega_B T'_{qo}$, which is proportional to the analog simulation of the machine's amortisseur flux-linkage.

D. Phase Detectors

One of the key novel features of the preferred embodiment is that it employs phase detectors to accomplish, in part, an analog simulation of the Park Transform.

Output signals $B_1\cos(\omega_s t_s + \psi)$ and $B_1\sin(\omega_s t_s + \psi)$ are generated by the device, as outputs from the VCO, as will be described in section G below. The argument, $\omega_s t_s + \psi$, of these two quadrature-related sinusoids are the analog simulations of the angular position of the d-axis and the q-axis of the machine's rotor, relative to the a-axis of the machine's stator. These two sinusoids are the reference signals for two phase detectors, PD1 and PD2. The phase detection of $-\lambda_{as}$, mentioned above, relative to reference $B_1\cos(\omega_s t_s + \psi)$ by PD1 is signal $\lambda_{ds}$, which is the analog simulation for Park's d-axis component of the machine's stator flux-linkage. Similarly, the phase detection of $-\lambda_{as}$ relative to $B_1\sin(\omega_s t_s + \psi)$ by PD2 is signal $\lambda_{qs}$, which is the analog simulation of Park's q-axis component of the machine's stator flux-linkage.

E. Summing Amplifiers

A linear combination of signals $-\lambda_{fs}/\omega_B T'_{do}$ and $\lambda_{ds}$ is applied to summing amplifiers A4 and A5, causing A4 to generate signal $-i_{fs}$, which was described above in section C, and also causing A5 to generate signal $+i_{ds}$, which is the analog simulation of Park's d-axis component of the machine's stator current.

A linear combination of signals $-\lambda_{qs}/\omega_B T'_{qo}$ and $\lambda_{qs}$ is applied to summing amplifiers A8 and A7, causing A8 to generate signal $-i_{qs}$, which was described above in section C, and also causing A7 to generate signal $+i_{qs}$, which is the analog simulation of Park's $q$-axis component of the machine's stator current.

F. Torque Balance Integrator

Output signals $\lambda_{qs}$ from PD2 and $+i_{ds}$ from A5 are applied to multiplier M1, causing M1 to generate their product. Output signals $\lambda_{ds}$ from PD1 and $+i_{qs}$ from A7 are applied to multiplier M2, causing M2 to generate their product. Input signal $T_{ts}$ is the analog simulation of the mechanical torque on the machine's rotor shaft (to an alternator from its prime mover, or from a motor to its load). The linear combination of input signal $T_{ts}$ and the output product signals from multipliers M1 and M2 is applied to integrator A6, causing A6 to generate signal $v_c$, which is proportional to the analog simulation of the machine's speed derivation from scheduled frequency.

G. Voltage Controlled Oscillator

One of the key novel features of the preferred embodiment is that it employs a voltage controlled oscillator to generate sinusoidal signals whose arguments are proportional to the analog simulation of the angular position of the machine's rotor. The instantaneous frequency of those sinusoidal signals is proportional to the analog simulation of the machine's mechanical frequency.

Output signal $V_c$, which is proportional to the analog simulation of the machine's speed deviation from its scheduled frequency, is applied as the control voltage of a voltage controlled oscillator, VCO, whose center frequency, $\omega_s$, is the analog simulation of the machine's scheduled frequency, causing the VCO to generate quadrature-related sinusoids $B_1\cos(\omega_s t_s+\psi)$ and $B_1\sin(\omega_s t_s+\psi)$, the output signals described above in section D.

H. Inverse Park Transform

Output signals $+i_{ds}$ from A5 and $B_1\cos(\omega_s t_s+\psi)$ from the VCO are applied to multiplier M3, causing M3 to generate their product. Output signals $+i_{qs}$ from A7 and $B_1\sin(\omega_s t_s+\psi)$ from the VCO are applied to multiplier M4, causing M4 to generate their product. The linear combination of the output signals generated by M3 and M4 is applied to summing amplifier A9, causing A9 to generate signal $-i_{as}$, the analog simulation of the inversion of the current flow into the a-phase of the machine's stator.

I. External Feedback

The device generates output signals which are the analog simulations of the machine's field current ($-i_{fs}$ from A4), stator current ($-i_{as}$ from A9), and speed derivation ($v_c$ from A6). These signals are simulations of the machine's response to its applied field voltage ($v_{fs}$), stator voltage ($v_{as}$), and shaft torque ($T_{ts}$). The device can be used to supply these simulated machine responses to external circuits which simulate the alternator's auxiliaries and interconnections (e.g. exciter). In such event, those external circuits can then generate the input signals $v_{fs}$, $v_{as}$, and $T_{ts}$ which were described above in section B, and the machine's interaction with its auxiliaries and interconnections is thereby simulated.

It will be apparent that by the employment of a voltage controlled oscillator and phase detectors, as shown in FIG. 4, the complete response of the machine can be simulated.

J. Identification of Coordinate Transformer

The coordinate transformer configuration appears twice in FIG. 4; the first instance involves the VCO, PD1, and PD2, the second instance involves the VCO, M3, M4, and A9.

The VCO, or voltage controlled oscillator, is a frequency modulated oscillator (FMO) whose output sinusoids depart from their center or carrier frequency by an amount which is linearly proportional to the applied input voltage modulating signal, $v_c$.

PD1 and PD2 are both phase detectors or demodulators (PFDD). M3 and M4 are multipliers which are used here as phase demodulators because of the frequencies involved.

A transformation of coordinates is accomplished from the $a$-axis of the stator as a primary reference frame, to the $d$-axis of the rotor as the abscissa axis and the $q$-axis of the rotor as the ordinate axis of a secondary reference frame. The rotation between these primary and secondary reference frames is the rotor's rotation angle and has a normal frequency of $\omega_s$ and a phase angle of $\psi$. The VCO generates the cosine of the rotor's rotation angle as a reference for PD1 and the sine of the rotor's rotation angle is a reference for PD2 (the 90° phase difference between sine and cosine accounts for the $q$-axis being perpendicular to the $d$-axis when measured in electrical degrees).

An example of an embodiment of a VCO which generates both sine and cosine follows: by employing a VCO whose center frequency is four times as high as the desired final output and applying that high frequency to a binary frequency divider, then the two resulting outputs are sinusoids with center frequency only twice as high as desired and with a 180° phase relation with respect to each other. By applying both of these latter sinusoids as the inputs to a pair of binary frequency dividers respectively, then the resulting four output sinusoids have the desired frequency and are in quadrature relationship with respect to each other. Two of these signals can be employed as the desired sine and cosine outputs.

PD1 has a negative gain constant. Thus, the inverse (negative) of the flux linkage on the $a$-axis yields the flux-linkage on the $d$-axis by demodulation with respect to the cosine of the rotation angle. PD2 has a positive gain constant but the inverse of the flux-linkage on the $a$-axis is demodulated with respect to the sine of the rotor angle, rather than the inverse of the sine, which would have been the correct reference for the additional 90° to the $q$-axis. Therefore, the output of PD2 involves a double negative resulting in the (positive) flux-linkage on the $q$-axis.

An additional inverse transformation of coordinates is accomplished from the $d$-axis and $q$-axis (as a new primary reference frame) to the $a$-axis (as a new secondary reference frame). Since this transformation is backwards from the previous transformation, then the rotation angle involved is the inverse (negative) of the rotor's rotation angle.

This additional inverse transformation is accomplished by the VCO, multipliers M3 and M4 and amplifier A9. The $d$-axis and $q$-axis components of the stator current are transformed to their two corresponding components on the $a$-axis and these two components are summed by amplifier A9 to yield the terminal current of the $a$-phase of the stator.

The embodiment of the inverse coordinate transformation is unusual in that simple multipliers, M3 and M4, serve as phase demodulators. A typical form for a phase demodulator involves a multiplication of input signal by reference signal, followed by a filter to remove the extraneous frequency components introduced by the multiplier (usually all the components at higher frequencies than either the reference or the input). However, the input signals, $i_{ds}$ and $i_{qs}$, are either dc (i.e. of zero frequency) or of such low frequency, relative to the reference that no extraneous frequency components are generated by the multipliers, M3 and M4. Consequently no filtering is required.

K. Identification of Phase-Locked-Loop

Phase-locked-loop (PLL) herein is defined to be a signal processing circuit of the following form: an input signal, external to the PLL, is demodulated with respect to a reference signal which is internal to the PLL. The resulting demodulated signal is processed by a signal processor (e.g., a loop filter) and the output of the signal processor is applied as the modulation input to either a frequency modulated oscillator (FMO) or to a phase modulated oscillator (PMO) which is internal to the PLL. The output of either the FMO or the PMO is fed back as the reference signal to the demodulator. This completes a signal circuit around the loop.

The device of FIG. 4 has two such PLL: the first PLL is associated with the $d$-axis. It starts with PD1. The demodulated output of PD1 is processed directly by amplifiers A4 and A5 and multiplier M2. The demodulated output of PD1 is also processed indirectly: by multiplier M1 via amplifier A5, by integrator A1 via amplifier A4, and by integrator A6 via multipliers M1 and M2. The signal processor terminates with $v_c$, the output of integrator A6, which is applied as the modulation input to the VCO, whose output phase modulated cosine is the reference for PD1, thus completing the loop.

The second PLL is associated with the $q$-axis. It starts with PD2. The demodulated output of PD2 is processed directly by amplifiers A7 and A8 and multiplier M1. The demodulated output of PD2 is also processed indirectly: by multiplier M2 via amplifier A7, by integrator A3 via amplifier A8, and by integrator A6 via multipliers M1 and M2. The signal processor terminates with $v_c$, the output of integrator A6, which is applied as the modulation input to the VCO, whose output phase modulated sine is the reference for PD2, thus completing the loop.

It should be noted that these two phase-locked-loops have several unusual aspects: both PLLs share one common modulated oscillator, VCO; the signal processor for the two PLLs are cross-coupled by multipliers M1 and M2; and both PLLs act upon a common input signal $-\lambda_{as}$, but in quadrature with respect to each other.

L. Alternatives and Performance

It should be noted at this point that there are many ways in which the simulation of FIG. 4 can be mechanized in terms of specific circuits and electronic components. It is, of course, desired that the system be characterized by low cost construction, high accuracy and stability, as well as be relatively easy to initially set up (such as the establishment of initial conditions and so forth) and enable ready interconnection so as to simulate a large number of alternators.

Tests which have been made indicate that stable systems can be constructed and will operate at the rate of 6 kilohertz, that is 100 times faster than real time; and permit cathode ray tube displays or digital print outs to be made of the transient and steady-state performance of alternators. The performance agrees well with standard digital simulations in the steady-state; and agrees well with digital simulation in modeling transient performance. The differences which exist between the present simulation and digital simulations in modeling transient performances are partly a result of the approximations inherent in the digital simulations and partly a result of the imperfections of some of the electronic components which have been tried. In general, however, laboratory tests have confirmed that the simulation system can be mechanized in a number of ways which will yield satisfactory accuracy, and the simulation will easily operate at 100 times faster than real time. Additionally, it is believed that a number of alternator simulation circuits can be interconnected by means of well known analog simulations of lines, busses, loads or other components for simulating systems of multiple alternators without reducing the speed or accuracy of simulation.

SIMULATION EQUATIONS AND SYSTEM COMPONENTS

A. The Equations to be Simulated

Turning now to a more detailed discussion of the present simulation concepts, the following set of perunitized alternator equations are well-known to those skilled in the art. A derivation of this set of equations will be given in detail later, but for the present purposes it is assumed that these are suitable equations which describe mathematically the performance of an alternator. The equations below are numbered in the margin and correspond with the numbers subsequently used in the derivation of these equations. As an aid in understanding the equations and discussion below, the following conventional symbols are used consistently in the alternator equations:

Variables $t$ stands for time
$\omega$ stands for frequency (radians/sec)
$v$ stands for voltage
$i$ stands for current
$\lambda, \Lambda$ stands for flux-linkages
$\theta$ stands for rotor angle, $a$ to $d$
$\phi, \psi$ stands for phase angles
$I$ stands for torque Constants $t_B$ base unit of time
$\omega_B$ base unit of frequency (radians/sec)
$P_B$ base unit of power
$V_B$ base unit of rms voltage
$H_C$ alternator's inertia constant
$X$ reactance
$G$ gain constant
$k$ base unit of simulation amplitude $\omega_s$ simulation frequency Subscripts (on Variable or Constant)

$pu$ indicates per-unitization
$B$ indicates base unit
$f$ indicates field
$a,b,c$, indicates stator phase-axis
$d$ indicates rotor direct-axis
$q$ indicates rotor quadrature-axis
$g$ indicates amortisseur
$s$ indicates simulation
$i$ indicates input The equations implemented by the system of FIG. 4 include those discussed below.

Equation (121) identifies a per-unitized time; an uncommon per-unitization in the study of rotating electric machines.

$$t_{pu} = t/t_B = \omega_B t \qquad (121)$$

Equation (131) defines a phase angle, $\psi$, by the difference between the per-unitized time and the machine's rotor angle, $\theta$.

$$\theta = t_{pu} + \psi \qquad (131)$$

Equation (138) is used to calculate the acceleration of the rotor, $d^2\theta/dt_{pu}^2$, from the machine's input torque, $T_{ipu}$, less the machine's back torque.

$$d^2\theta/dt_{pu}^2 = (P_B/2\omega_B H_C)[T_{ipu} + \tfrac{1}{2}(\lambda_{dpu}i_{qpu} - \lambda_{qpu}i_{dpu})] \quad (138)$$

Equations (126) and (154) are used to calculate the rotor's flux-linkages: field flux-linkage $\lambda_{fpu}$ and amortisseur flux-linkage $\lambda_{gpu}$.

$$v_{fpu} = i_{fpu} + [d/dt_{pu}](\lambda_{fpu}) \qquad (126)$$

$$0 = i_{gpu} + [d/dt_{pu}](\lambda_{gpu}) \qquad (154)$$

Equation (129) is used to calculate the stator's flux-linkage, $\lambda_{apu}$, which is then identified as an amplitude modulated ($\Lambda pu$) and phase modulated ($\phi$) signal by Equation (151).

$$v_{apu} = d/dt_{pu}(\lambda_{apu}) \qquad (129)$$

$$\lambda_{apu} = \Lambda_{pu}\cos(t_{pu}+\phi) \qquad (151)$$

Equations (152) and (153) express the stator's $a$-axis flux-linkages, $\lambda_{apu}$, after it is transformed to the rotor's $d$-axis and $q$-axis, and becomes flux-linkages $\lambda_{dpu}$ and $\lambda_{qpu}$ respectively.

$$\lambda_{dpu} = \Lambda_{pu}\cos(\phi-\psi) \qquad (152)$$

$$\lambda_{qpu} = \Lambda_{pu}\sin(\phi-\psi) \qquad (153)$$

Equations (143) and (150) are used to calculate the $d$-axis components of the stator's current, $i_{dpu}$, and the rotor's field current, $i_{fpu}$, by forming linear combinations of the two $d$-axis flux-linkages.

$$i_{dpu} = \frac{1}{X'_{dpu}}\lambda_{dpu} - \frac{\sqrt{2}}{\omega_B T'_{do} X'_{dpu}}\lambda_{fpu} \qquad (143)$$

$$i_{fpu} = \frac{-[X_{dpu}-X'_{dpu}]}{\sqrt{2}X'_{dpu}}\lambda_{dpu} + \frac{X_{dpu}}{X'_{dpu}\omega_B T'_{do}}\lambda_{fpu} \qquad (150)$$

Equations (155) and (156) are used to calculate the $q$-axis components of the stator's current, $i_{qpu}$, and the amortisseur's current, $i_{gpu}$, by forming linear combinations of the two $q$-axis flux-linkages.

$$i_{qpu} = \frac{1}{X'_{qpu}}\lambda_{qpu} - \frac{\sqrt{2}}{\omega_B T'_{qo} X'_{qpu}}\lambda_{gpu} \qquad (155)$$

$$i_{gpu} = \frac{-[X_{qpu}-X'_{qpu}]}{\sqrt{2}X'_{qpu}}\lambda_{qpu} + \frac{X_{qpu}}{X'_{qpu}\omega_B T'_{qo}}\lambda_{gpu} \qquad (156)$$

Equation (130) is used to calculate the stator's $a$-axis current, $i_{apu}$, from its $d$-axis and $q$-axis components, $i_{dpu}$ and $i_{qpu}$.

$$i_{apu} = i_{dpu}\cos(\theta) - i_{qpu}\sin(\theta) \qquad (130)$$

Although the various equations set forth above are basic equations, they are not yet suitable for mechanization in the present simulation since (1) time which is represented in the simulation must be real time (i.e., it must have dimensions or seconds, or minutes, etc.); however, the above per-unit equations represent time as a dimensionless (i.e., per unitized) quantity; and (2) all other alternator variables (e.g. $v_a$, $\lambda_d$, $i_q$, $T_i$, etc.) must be represented in the simulation as equivalent voltages; however, per-unit equations represent these variables as dimensionless (i.e., perunitized) quantities. In order to convert the above per-unitized alternator equations to a form suitable for implementation in the analog simulation, the following three dicta are assumed:

1. All angles must remain invariant between the simulation and the per-unitized quantities.
2. Simulated time (denoted by $t_s$) will be related to per-unit time (denoted by $t_{pu}$) by $$t_{pu} = \omega_s t_s \qquad (166)$$

where the constant $\omega_s$ is the base frequency of the simulation and has the dimensions of rad/sec.

3. The simulation voltage (denoted by $\chi_s$) will be related to its corresponding per-unitized variable (denoted by $\chi_{pu}$) by $$\chi_{pu} = \chi_s/k \qquad (167)$$

where the positive constant $k$ has the dimensions of volts and is the base unit of amplitude for all signals in the simulation The first of the above-listed three dicta permits the simulation to provide phase angle data directly. The second of the above-listed dicta permits the simulation to be time-scaled so that it runs faster (or slower) than real time, simply by postulating a value for $\omega_s$. More specifically, the ratio of simulated time ($= t_s$) to real time ($= t$) can be evaluated from equations (121) and (166), and is given by $$t_s/t = t_{pu}/\omega_s)/(t_{pu}/\omega_B) = \omega_B/\omega_s \qquad (168)$$

where $\omega_B$ is the base radian-frequency of the alternator (usually, $2\pi \times 60$ rad/sec). For example, if $\omega_s$ is chosen to equal 100 $\omega_B$, then the simulation will operate in 1/100 of the time required for operation of the actual alternator (i.e., the simulation will operate 100 times faster than real time).

The third of the above-listed three dicta permits the simulation to be voltage-scaled simply by postulating a value for $k$.

The methodical application of the above-listed three dicta, by substituting (166) and (167) into the set of per-unit alternator equations, yields the following set of simulation equations:

$$v_{fs} = i_{fs} + (1/\omega_s)[d/dt_s](\lambda_{fs}) \qquad (171)$$

$$v_{as} = (1/\omega_s)[d/dt_s](\lambda_{as}) \qquad (172)$$

$$i_{as} = i_{ds}\cos(\theta) - i_{qs}\sin(\theta) \qquad (173)$$

$$\theta = \omega_s t_s + \psi \qquad (174)$$

$$d^2\theta/dt_s^2 = (P_B\omega_s^2/2k^2\omega_B{}^H{}_C)[kT_{is} + \tfrac{1}{2}(\lambda_{ds}i_{qs} - \lambda_{qs}i_{ds})] \qquad (175)$$

$$i_{ds} = (1/X'_{dpu})\lambda_{ds} - (\sqrt{2}/\omega_B T'_{do} X'_{dpu})\lambda_{fs} \qquad (176)$$

$$i_{fs} = -[(X_{dpu}-X'_{dpu})/\sqrt{2}\, X'_{dpu}]\lambda_{ds} + (X_{dpu}/X'_{dpu}\omega_B T'_{do})\lambda_{fs} \qquad (177)$$

$$\lambda_{as} = \Lambda_s \cos(\omega_s t_s + \phi) \qquad (178)$$

$$\lambda_{ds} = \Lambda_s \cos(\phi - \psi) \qquad (179)$$

$$\lambda_{qs} = \Lambda_s \sin(\phi - \psi) \qquad (180)$$

$$0 = i_{gs} + (1/\omega_s)[d/dt_s](\lambda_{gs}) \qquad (181)$$

$$i_{qs} = (1/X'_{qpu})\lambda_{qs} - (\sqrt{2}/\omega_B T'_{qo} X'_{qpu})\lambda_{gs} \qquad (182)$$

$$i_{gs} = -[(X_{qpu}-X'_{qpu})/\sqrt{2}\, X'_{qpu}]\lambda_{qs} + (X_{qpu}/X'_{qpu}\omega_B T'_{qo})\lambda_{gs} \qquad (183)$$

B. Basic Components Used in Simulation

Before returning to the system of FIG. 4, the basic components which will be used as building blocks will be discussed. These are illustrated individually in FIGS. 5 through 11.

Operational Amplifiers

As is well-known, operational amplifiers are extremely high gain amplifiers which are frequently employed in analog computers. Operational amplifiers are customarily provided with feedback in order to mechanize any one of a multitude of transfer functions, $Y(p)$. If we define $P$ = Laplace transform operator in lieu of differentiation with respect to time
$V_{IN}(p)$ = Laplace transform of input voltage
$V_{OUT}(p)$ = Laplace transform of output voltage
then the transfer-function of any linear device is defined to be $$Y(p) = V_{OUT}(p)/V_{IN}(p) \qquad (184)$$

Figure 5:
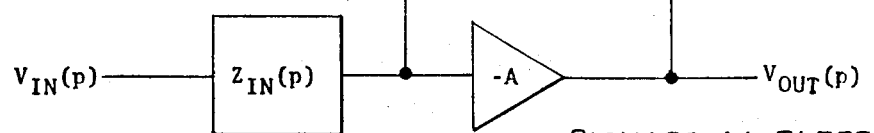
FIGS. 5 through 11 are block diagrams of components or building blocks of the simulation system of FIG. 4.

Now consider an operational amplifier having a voltage gain of $(-A)$, where $A$ is a very large number (typically, 50,000 or more). If the amplifier is provided with a feedback impedance, $Z_F(p)$, and all these elements are combined as shown in FIG. 5, then it may be shown that the transfer function of the FIG. 5 configuration is $$Y(p) = V_{OUT}(p)/V_{IN}(p) \approx -[Z_F(p)/Z_{IN}(p)] \qquad (185)$$

where the approximation involves the neglect of terms in $(1/A)$ relative to unity. Note that the approximation is extremely accurate for the very large values of gains customarily employed in operational amplifiers. As is conventional with block diagrams, single line drawings are used, and in these drawings a voltage which is indicated on a line is understood to be measured from that line to ground.

Summing Amplifiers

Operational amplifiers can be used to implement a weighted summation of a number of signals. For example, in the simulation an equation having a form similar to the following will be implemented:

$$V_{OUT}(p) = \alpha_1 V_1(p) + \alpha_2 V_2(p) \qquad (186)$$

where $\alpha_1$ and $\alpha_2$ are positive gain constants. This equation (186) can be mechanized as shown in FIG. 6 where $$R_{F1}/R_1 = \alpha_1 \qquad (187)$$

$$R_{F1}/R_2 = \alpha_2 \qquad (188)$$

$$R_{F2}/R_3 = 1 \qquad (189)$$

Figure 6:
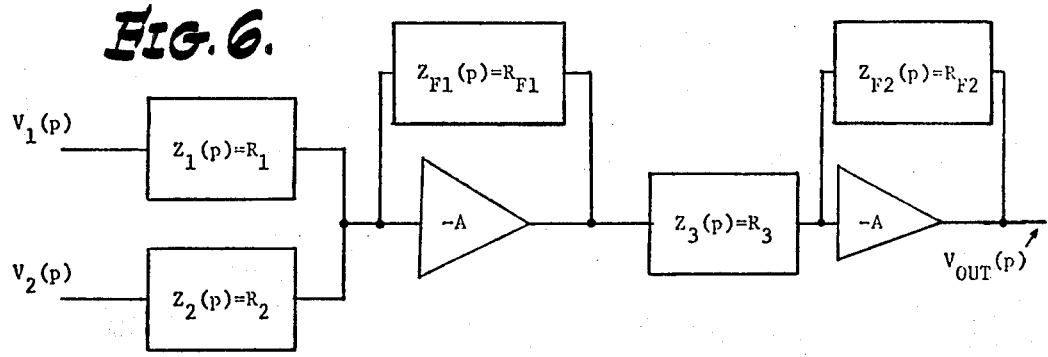

In FIG. 6 and equations (187) through (189), note that:
1. All quantities denoted by R represent values of resistance. For example, the block labelled $$Z_1(p) = R_1$$

at the input of a first operational amplifier (–A to the left in FIG. 6) can be mechanized by a resistor of $R_1$ ohms (providing that all other values of R are specified in ohms).

2. The second operational amplifier (–A to the right in FIG 6) and its associated input and feedback impedances are used in order to provide a gain of (–1). This gain is necessary in order to compensate the negative gain of the first operational amplifier. Some operational amplifiers are available which have positive gains; if an amplifier of this type were employed (in a slightly different configuration than that for operational amplifier No. 1), there would be no need for the second operational amplifier as will be apparent to those skilled in the art.

3. The FIG. 6 configuration only provides an approximate mechanization of equation (186). However, this approximation is excellent if, as is usually the case, the magnitude of A is large relative to unity ($A \gg 1$).

Integrators

Operational amplifiers can be used to implement integration with respect to time. For example, suppose the following equation is to be implemented, $$v_{OUT}(t) = -\alpha \int_0^t v_{IN}(t')dt' \qquad (190)$$

where $\alpha$ is a positive gain constant. This equation assumes that $v_{OUT}(t=0) = 0$, which is valid for the integrators described herein. The Laplace Transform of equation (190) is $$V_{OUT}(p) = -\alpha V_{IN}(p)/p \qquad (191)$$

where $V_{OUT}(p)$ and $V_{IN}(p)$ are the Laplace Transforms of $v_{OUT}(t)$ and $v_{IN}(t)$, respectively.

Figure 7:
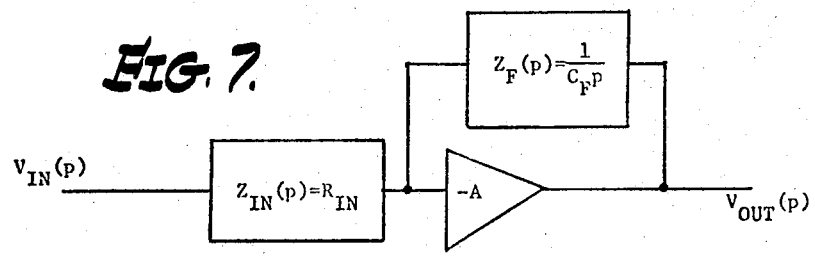

It will be apparent that equation (191) can be implemented as shown in FIG. 7.

In FIG. 7 note the following:
1. The feedback impedance, $Z_F(p)$, is assumed to be mechanized by a capacitor having a capacitance of $C_F$ farads. Such a capacitor will provide the required feedback impedance.
2. The input impedance, $Z_{IN}(p)$, is assumed to be mechanized by a resistor having a resistance of $R_{IN}$ ohms. Such a resistance will provide the required input impedance.
3. The value of $R_{IN}$ and $C_F$ must satisfy $$1/R_{IN}C_F = \alpha \qquad (192)$$

in order to satisfy equation (190).

Note also that the FIG. 7 configuration can be expanded to accommodate multiple inputs simply by feeding the $i$th input through a resistance of $R_i$ ohms into the operational amplifier. The transfer function for each such input will be $$V_i(p) = V_{OUT}(p)/V_i(p) = -1/R_i C_F P \qquad (193)$$

Symbolism for Amplifiers and Integrators

Figure 8:
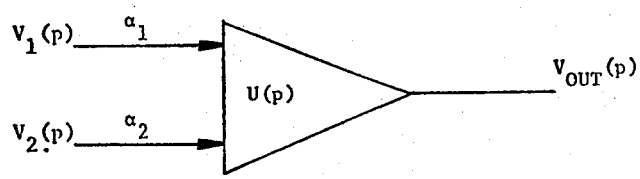

As is known to those skilled in the art, amplifiers and integrators are as shown in FIG. 8. The symbol of FIG. 8 implies that $V_1(p)$, $V_2(p)$, etc. = Laplace Transforms of input-voltages to the operational amplifier and its associated feedback and input impedances are related by the equation $$V_{OUT}(p) = [\alpha_1 V_1(p) + \alpha_2 V_2(p)] U(p) \quad (194)$$

where $U(p)$ is either a constant if amplification is desired, or is proportional to $(1/p)$ if integration is desired.

Multipliers

Figure 9:
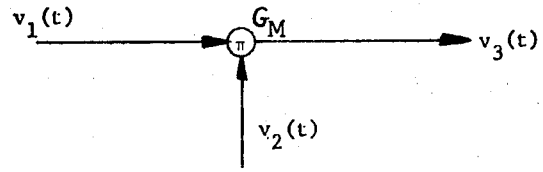

As is known to those skilled in the art, electronic multipliers are as shown in FIG. 9. The symbol of FIG. 9 implies that $$G_M[v_1(t)] \cdot [v_2(t)] = v_3(t) \quad (195)$$

where gain constant $G_M$ has the dimensions of 1/volt.

Phase Detectors

Figure 10:
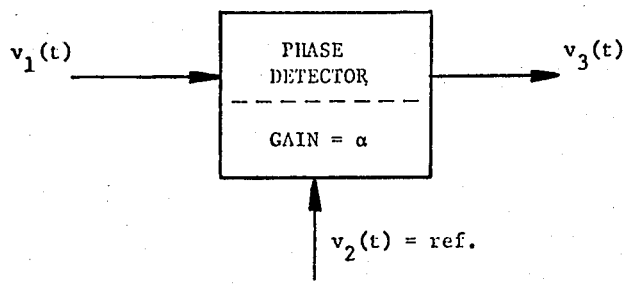

The phase detectors which have been briefly discussed are as shown in FIG. 10.
In FIG. 10, if $$v_1(t) = A_1(t) \cos[\omega_s t + \delta_1(t)] \quad (196)$$

$$v_2(t) = B_1(t) \cos[\omega_s t + \delta_2(t)] \quad (197)$$

then the symbolism implies that $$v_3(t) = [\alpha A_1(t)/2a] \cos[\delta_1(t) - \delta_2(t)] \quad (198)$$

Note that the output voltage, $v_3(t)$, is independent of the amplitude of the reference voltage (denoted by ref.), $v_2(t)$ provided that the amplitude exceeds zero. The phase detector's gain constant, $\alpha$, is dimensionless.

In the present applications of a phase detector, the reference voltage has a constant and known amplitude. Consequently, amplitude $B_1(t)$ will be defined as the positive constant $B_1$, with the dimension of volts, and the phase detector relationship given by equation (198) can be regarded as equivalent to $$v_3(t) = (\alpha/G_M B_1) [G_M v_1(t) \cdot v_2(t)]_{LOW\ PASS} \quad (199)$$

where the subscript "LOW PASS" implies that all terms at frequencies $\geq \omega_s$ rad/sec are filtered out. Equation (199) can be derived from (198) by simple trigonometry, under the assumption that the $A_1(t)\cos[\delta_1(t) - \delta_2(t)]$ term has a sufficiently low frequency to be unaffected by the "LOW PASS" filtering operation.

Equation (199) shows that a phase detector can be mechanized as a multiplier, followed by a low pass filter, followed by an amplifier, where the low pass gain of the filter-amplifier combination equals $(\alpha/G_M B_1)$, and where the low pass filter eliminates all signals having frequencies $\geq \omega_s$ rad/sec, without affecting the $A_1(t) \cos[\delta_1(t) - \delta_2(t)]$ term. This mechanization is illustrative, but others can be used. A notch filter (with its substantially reduced phase-shift as compared to a low-pass filter) is preferred for use with the phase detector in order to have stable and proper operation. The operation performed by the phase detector is necessary for the simulator. However, the exact mechanization of the phase detector is not critical, provided that it performs the operations characterized by equations (196) through (198).

Voltage Controlled Oscillator

Figure 11:
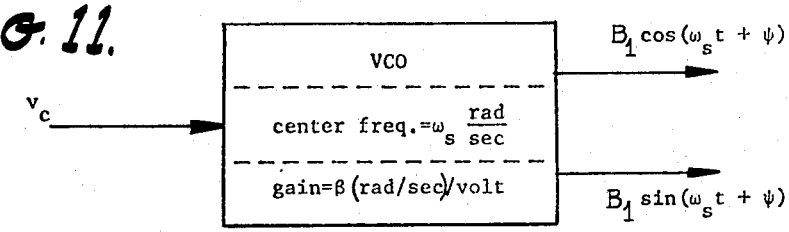

A voltage controlled oscillator (VCO) is shown in FIG. 11. The VCO is an oscillator whose frequency deviation from its center frequency ($= \omega_s$ rad/sec) is proportional to the applied control voltage ($= v_c$). In the present application, the VCO is made to generate two separate output sinusoidal voltages, each of constant amplitude $B_1$ volts, but in quadrature with respect to each other (cf. the $B_1$ sine and $B_1$ cosine outputs in FIG. 11). The FIG. 11 symbolism implies that the equation satisfied by the VCO is $d\psi/dt =$ frequency derivation of VCO from its center frequency of $\omega_s$
$= \beta v_c$ [rad/sec] \quad (200)

where the VCO's gain constant, $\beta$, has the dimensions of (rad/sec)/volt.

The VCO can be mechanized by utilizing a standard, solid-state sinusoidal oscillator which has a voltage variable capacitance in its frequency determining circuit (i.e., its "tank" circuit). The mechanization discussed is illustrative, and the exact mechanization of the VCO is immaterial, provided that it performs the operations characterized by FIG. 11 and equation (200). One output is obtained directly from the VCO; and the other output can be obtained by passing the first output through a 90° phase shifting network.

THE SIMULATION SYSTEM

Turning again to FIG. 4, the same is a block diagram for simulation of a linear alternator.
A. Mechanization of the Field Equations The equations characterizing the field variables (i.e., those variables subscripted by $f$) are implemented by integrator A1 and amplifier A4 in FIG. 4. Using the previously discussed symbolization interpretation, we see that the block diagram simulates $$\frac{-\lambda_{fs}(t_s)}{\omega_B T'_{do}} = -G_1 \omega_s \int_0^{t_s} [-i_{fs}(t') + V_{fs}(t')] dt' \quad (201)$$

which can be differentiated and rearranged to obtain $$[1/\omega_s G_1 \omega_B T'_{do}][d\lambda_{fs}(t_s)/dt_s] = [v_{fs}(t_s) - i_{fs}(t_s)] \quad (202)$$

For purposes of clarifying the discussion it is not desirable to explicitly indicate the functional dependence of he variables on $t_s$, the simulated time. Consequently, $\lambda_{fs}$ will be expressed as $\lambda_{fs}(t_s)$, and so forth. The block diagram also simulates $$-i_{fs}(t_s) = [-G_3/\omega_B T'_{do}]\lambda_{fs}(t_s) + G_4 \lambda_{ds}(t_s) \quad (203)$$

Comparison of (202) with (171), and (203) with (177), shows that the implementation will properly simulate the desired alternator equations, provided that the following values of gain constants are specified:

$$G_1 = 1/\omega_B T'_{do} \quad (204)$$
$$G_3 = X_{dpu}/X'_{dpu} \quad (205)$$
$$G_4 = (X_{dpu} - X'_{dpu})/\sqrt{2} X'_{dpu} \quad (206)$$

This discussion of the field equation exemplifies three important features of the simulation, viz:
1. All differentiation operations required by the alternator equations are implemented inversely by integration operations. This is done so as to avoid the increase in noise which almost always accompanies differentiation operations in analog computers.
2. Sometimes it is desirable to have the voltage on a line proportional, rather than equal, to the voltage associated with a fundamental alternator parameter. For example, nowhere in the simulation is a voltage equal to $\lambda_{fs}$; instead, the voltage used is equal to $$-\lambda_{fs}/\omega_B T'_{do}$$

This is done so as to scale all signal voltages to values of comparable relative magnitudes so that no signal is so small as to be masked by residual system noise.

3. Integrators having negative gains are used, even though this causes some signals to equal the negative of the corresponding alternator parameter. (Cf., the appearance of $(-i_{fs})$ instead of $(+i_{fs})$ in the block diagram.) This is done because the implementation of a positive gain integrator, using only one operational amplifier, is a difficult task, whereas implementation of a negative gain integrator, using one operational amplifier, is easy.

B. Mechanization of Amortisseur Equations

Equations characterizing amortisseur variables (i.e., those variables subscripted by $g$) are implemented by integrator A3 and amplifier A8 in FIG. 4. If it is desirable to neglect amortisseur variables or to simulate an alternator which does not have an amortisseur, then this can be accomplished either by deleting integrator A3 and amplifier A8 in FIG. 4, or, equivalently, by setting gain constants $G_2$, $G_9$, $G_{10}$ and $G_{11}$ to zero. Using the previously discussed symbolization interpretation, it can be seen that the block diagram simulates $$\frac{-\lambda_{gs}(t_s)}{\omega_B T'_{qo}} = -G_2 \omega_s \int_0^{t_s} [-i_{gs}(t')]dt' \quad (207)$$

Which can be written as $$\frac{1}{\omega_s}\frac{d\lambda_{gs}(t_s)}{dt_s} = G_2 \omega_B T'_{qo}[-i_{gs}(t_s)] \quad (208)$$

The block diagram also simulates $$-i_{gs}(t_s) = G_{10}\lambda_{qs}(t_s) + G_{11}[-\lambda_{gs}(t_s)/\omega_B T'_{qo}] \quad (209)$$

Comparison of (208) with (181), and (209) with (183), shows that the implementation will properly simulate the desired equations provided that the following values of gain constants are employed:

$$G_2 = 1/\omega_B T'_{qo} \quad (210)$$
$$G_{10} = (X_{qpu} - X'_{qpu})/\sqrt{2} X'_{qpu} \quad (211)$$
$$G_{11} = X_{qpu}/X'_{qpu} \quad (212)$$

C. Mechanization of the Equations for $\lambda_{ds}$ and $\lambda_{qs}$

The equations for the Park-Transformed, stator flux linkages $\lambda_{ds}$ and $\lambda_{qs}$, are implemented by integrator A2 and phase detectors PD1 and PD2 in FIG 4. Using the previous interpretation of symbolization, it will be apparent that the diagram simulates $$-\lambda_{as}(t_s) = -\omega_s \int_0^{t_s} v_{as}(t')dt' \quad (213)$$

which can be written as $$(1/\omega_s)[d\lambda_{as}(t_s)/dt_s] = v_{as}(t_s) \quad (214)$$

Comparison of (214) and (172) shows that the block diagram correctly implements equation (172).

It will be shown how $\lambda_{ds}$ and $\lambda_{qs}$ are obtained from $\lambda_{as}$ by the present coordinate transformer. First note from (178) that it is assumed that $\lambda_{as}$ is expressible as $$\lambda_{as}(t_s) = \Lambda_s(t_s) \cos[\omega_s t_s + \phi(t_s)] \quad (215)$$

where $\Lambda_s(t_s)$ and $\phi(t_s)$ are unspecified time functions. Equation (215) shows that the assumption is tantamount to assuming that $\lambda_{as}$ is quasisinusoidal, i.e., $\lambda_{as}$ can be represented as a sinusoid having an amplitude and phase which may be time varying. Note that this representation easily permits description of $\lambda_{as}(t_s)$ as having a constant radian frequence of $\omega_s + \Delta\omega$. In this case, $\phi(t_s)$ would equal $(\Delta\omega)t_s$. Furthermore, as shown by equation (214), this assumption is also tantamount to assuming that $v_{as}$, the simulated stator terminal voltage, is also quasi-sinusoidal. Since in almost all cases of practical interest the stator terminal voltage is quasi-sinusoidal, the representation of $\lambda_{as}$ given by equation (215) is satisfactory for the present purposes.

The system of FIG. 4 obtains $\lambda_{ds}$ from $\lambda_{as}$, assuming the validity of equation (215). Referring to (a) phase detector PD1 in the block diagram, (b) the assumed characteristics of phase detectors described earlier, and (c) the assumed value of $\lambda_{as}$ given by equation (215), it can be seen that the following equation is implemented:

$$\lambda_{ds}(t_s) = \{(-2)[-\Lambda_s(t_s)]/2\} \cos[\phi(t_s) - \psi(t_s)]$$
$$= \Lambda_s(t_s) \cos[\phi(t_s) - \psi(t_s)] \quad (216)$$

where the $(-2)$ factor in the first equality of (216) is due to the fact that the block diagram postulates "-GAIN=$-2$" for PD1. Comparison of (216) with (179) shows that the phase detector PD1 correctly implements the desired coordinate transformation relationship between $\lambda_{ds}$ and $\lambda_{as}$.

The method of computing $\lambda_{qs}$ from $\lambda_{as}$ is completely analogous to the foregoing, and is accomplished by the phase detector PD2 in FIG. 4. Referring to phase detector PD2, equation (215), and using the assumed characteristics of phase detectors, the diagram implements the following equation:

$$\lambda_{qs}(t_s) = \{(+2)[-\Lambda_s(t_s)]/2\} \sin[\psi(t_s) - \phi(t_s)]$$
$$= \Lambda_s(t_s) \sin[\phi(t_s) - \psi(t_s)] \quad (217)$$

Comparison of (217) with (180) shows that the phase detector PD2 correctly implements the desired coordinate transformation relationship between $\lambda_{qs}$ and $\lambda_{as}$.

D. Mechanization of the Equations for $i_{ds}$ and $i_{qs}$

The direct axis stator current, $i_{ds}$, appears in FIG. 4 at the output of amplifier A5. Examination of the figure shows that the following equation is simulated:

$$i_{ds}(t_s) = G_6\lambda_{ds}(t_s) - [G_5\lambda_{fs}(t_s)/\omega_B T'_{do}] \quad (218)$$

Comparison of (218) and (176) shows that the diagram will correctly simulate equation (176) provided that the following values of gain constants are used:

$$G_5 = \sqrt{2}/X'_{dpu} \quad (219)$$
$$G_6 = 1/X'_{dpu} \quad (220)$$

Now consider the quadrature axis stator current, $i_{qs}$, which appears in the diagram at the output of amplifier A7. Examination of FIG. 4 shows that the following equation is simulated:

$$i_{qs}(t_s) = G_8\lambda_{qs}(t_s) - [G_9\lambda_{gs}(t_s)/\omega_B T'_{qo}] \quad (221)$$

Comparison of (221) and (182) shows that the diagram will correctly simulate equation (182) provided that the following values of gain constants are used:

$$G_8 = 1/X'_{qpu} \quad (222)$$
$$G_9 = \sqrt{2}/X'_{qpu} \quad (223)$$

E. Mechanization of the Torque Equations

Equation (175) which was set forth earlier described the relationship between $(d^2\theta/dt_s^2)$, the simulated angular acceleration of the alternator's rotor and $T_{ls}$, the simulated mechanical input torque. This equation is implemented in FIG. 4 by integrator A6, multipliers M1 and M2, and the VCO.

The output voltage of integrator A6 is labelled $v_c$, indicating that it is the control voltage applied to the VCO. Examination of the diagram, using the previously discussed symbolism for amplifiers and multipliers, shows that the combination of M1, M2, and A6 implements the following equation:

$$v_c(t_s) = -G_7\omega_s \int_0^{t_s} \{+(0.5)G_M\lambda_{qs}(t')i_{ds}(t') - kG_M T_{is}(t') - (0.5)G_M\lambda_{ds}(t')i_{qs}(t')\}dt' \quad (224)$$

which can be differentiated and rearranged to obtain $$dv_c(t_s)/dt_s = +G_M G_7 \omega_s \{+kT_{is}(t_s) + \tfrac{1}{2}[\lambda_{ds}(t_s)i_{qs}(t_s) - \lambda_{qs}(t_s)i_{ds}(t_s)]\} \quad (225)$$

But, using the previously discussed symbolism, it is known that $\psi$, the VCO output phase angle, and $v_c$, the control voltage to the VCO, are related by $$d\psi(t_s)/dt_s \, \beta v_c(t_s) \quad (226)$$

where, as indicated in FIG. 4, $\beta$ is the VCO gain constant. Now note from the definition of $\psi$ given by equation (174), that $$d\theta(t_s)/dt_s \, \omega_s + [d\psi(t_s)/dt_s] \quad (227)$$

The conjunction of (226) and (227) shows that the diagram implements the equation, $$v_c(t_s) = (1/\beta)\{[d\theta(t_s)/dt_s] - \omega_s\} \quad (228)$$

Consequently, by combining (225) and (228) it can be seen that the diagram implements $$d^2\theta(t_s)/dt_s^2 = \beta\, dv_c(t_s)/dt_s$$
$$= \beta G_M G_7 \omega_s \{KT_{ls}(t_s) + \tfrac{1}{2}[\lambda_{ds}(t_s)i_{qs}(t_s) - \lambda_{qs}(t_s)i_{ds}(t_s)]\} \quad (229)$$

Comparison of equations (229) and (175) shows that the diagram will properly implement the torque equation, provided that the following value of gain coefficient is employed:

$$G_7 = P_B \omega_s / 2 G_M k^2 \beta H_C \omega_B \quad (230)$$

Of additional interest is the value of $v_c$, since this voltage can be related to the deviation of the rotor's rotational frequency from its nominal value of $\omega_s$. In particular, utilities customarily define the per-unit frequency deviation of the rotor as $$[\Delta\omega(t)]_{pu} = \left[\dfrac{\dfrac{d\theta(t)}{dt} - \omega_B}{\omega_B}\right] \quad (231)$$

Therefore, if
$[\Delta\omega(t_s)]_{pu}$ = per-unit frequency deviation as a function of simulated time
equation (231) can be written as $$[\Delta\omega(t_s)]_{pu} = \left[\dfrac{\dfrac{d\theta(t_s)}{dt_s}\dfrac{dt_s}{dt} - \omega_B}{\omega_B}\right] \quad (232)$$

Using (167) it is seen that $$dt_s/dt = \omega_B/\omega_s \quad (233)$$

so that (232) can be written as $$[\Delta\omega(t_s)]_{pu} = \dfrac{\left[\dfrac{d\theta(t_s)}{dt_s}\right] - \omega_s}{\omega_s} \quad (234)$$

Comparison of (228) and (234) yields the final and useful equation $$[\Delta\omega(t_s)]_{pu} = (\beta/\omega_s) v_c(t_s) \quad (235)$$

F. Mechanization of the Equations for $i_{as}$

The simulated stator current, $i_{as}$, is mechanized by amplifier A9 and multipliers, M3 and M4, in FIG. 4. Referring to the diagram, it implements the equation $$-i_{as}(t_s) = -i_{ds}(t_s)\cos[\omega_s t_s + \psi(t_s)]$$
$$+i_{qs}(t_s)\sin[\omega_s t_s + \psi(t_s)] \quad (236)$$

Comparison of equation (236) with equations (173) and (174) shows that the diagram properly implements the equations for $i_{as}$.

It will be apparent to those skilled in the art that the system of FIG. 4 provides an analog simulator, using the mechanizable building blocks of FIGS. 5 through 11, which will properly implement the per-unitized equations for an alternator earlier described. The specific derivations of these equations will be presented subsequently. However, it should be noted that because (1) the per-unit equations adequately describe the operation of the alternator model under balanced conditions; (2) a mechanization based on the FIG. 4 block diagram will properly implement these per-unit equation; and (3) the simulation can also be easily made to operate faster than real time, by a factor of $(\omega_s/\omega_B)$, simply by choosing an appropriate value of $\omega_s$, it is therefore concluded that the simulation technique described herein can adequately simulate in faster than real time the balanced operation of the alternator model.

GENERALIZATION OF THE PREFERRED EMBODIMENT

The preferred embodiment discussed above is directed to use in the simulation of either a synchronous or an induction machine, based upon a particular model. The model, in the appendix below, is itself subject to considerable generalization which can also be added to the preferred embodiment. Several such generalizations follow.

A. Purely as a matter of convenience, the preferred embodiment's model neglects both the resistive loss and the magnetic leakage found in the stator of the machine. Both of these effects could be included in the model and in the embodiment. They would be implemented by a feedback to integrator A2 of the simulation of the stator's current (the output of amplifier A9) or, equivalently, by a feedback of the $d$-axis and $q$-axis components of that current (the outputs of amplifiers A5 and A7) to create reductions in the corresponding axes flux-linkages (the outputs of PD1 and PD2).

B. A two pole model has been assumed for convenience and because, from well-known theory, the two pole model constants or parameters may be chosen to reflect the behavior of any multipole machine. The two pole model is completely general for the type of studies for which this simulation is intended. A three phase synchronous machine has been assumed but the simulation of two phase, four phase, six phase or any other multiphase balance machine requires only recalculation of the gains to be used in the simulation. Similarly, unbalanced operation of two phase, or other multiphase machines follows directly from the discussion.

C. The presence or absence of auxiliary control equipment, such as voltage regulators or speed governing systems does not modify the portion of the simulation claimed as novel. Such devices will merely insert auxiliary loops around, within or containing portions of the novel portions of this simulation. When such loops are included, the resulting system may be manipulated in a variety of ways using well-known techniques. The embodiment given preserves the identity of the machine and inserts control loops in a readily recognizable manner. Other simulations could be devised where the manipulations reduce out or in other ways modify the control loops. Such variations are in simulation technique and not in the basic theory of the simulation.

D. The preferred embodiment has been implemented using a flow from phase voltages to phase currents. Various combinations of flow directions will result in differing simulations. However, such simulations all employ the components claimed as novel either as an explicit analog loop or through hybrid conversions. The role of novel components may be undertaken by other than analog means utilizing these conversions.

E. The embodiment of this simulation has been illustrated by obtaining the equations by means of the Park Transformation given in the Appendix. This invention is applied to the solution of a set of equations of a particular form and it is well recognized that this particular transform is not the only one which will result in the desired equations. Coordinate transformations of the Park Form, namely, those employing sines and cosines of arguments involving the rotational angle, can result in a set of equations of similar form and so applicable to simulation by the means applied to the preferred embodiment.

F. The specific per unitization, normalization or scaling scheme used in discussing this embodiment was selected to conform the power system practice and to result in convenient parameters and signals in the simulation. Such scaling is a matter of convenience and is not basic to this novel simulation.

G. A machine may operate as a motor or as a generator (alternator). This simulation applies to either device.

H. The rotor model, used for the preferred embodiment, included merely two coils, one in the $d$-axis and one in the $q$-axis. However, it is well known that many coils can be modeled by such an orthogonal decomposition. But, one coil, per axis, is not necessarily sufficient. Specifically, if we consider a real machine, which may have an amortisseur (single deck or multi-deck), field collars, and eddy current losses in the body of the rotor — all in addition to the field coil or coils — then the model should have several coils on the $d$-axis and $q$-axis. However, such coupled coils, per axis, can be represented in the preferred embodiment in a relatively straightforward way: the $d$-axis coils can be represented by replacing amplifiers A4 and A5 with filters of the requisite characteristics (rather than merely constant coefficients). The $q$-axis coils can also be represented by a similar replacements of amplifiers A7 and A8. Nonexternally energized winding loops may appear explicitly as shown, or may be implicit by the elimination of the loop by well-known control system techniques.

I. The preferred embodiment is based upon a model which neglects the magnetic saturation of the iron in that machine. However, saturation can be added to the present device. The simplest such representation would be to add a saturating element (e.g., a diode-resistor circuit) between the output of integrator A1 and the inputs to amplifiers A4 and A5. This could model the magnetic saturation of the field. Another more complicated model would be to add non-linear amplification after the outputs of each of amplifiers A4, A5, A7 and A8. This model has the disadvantage of being more complicated but it has the advantage of being the same as the saturation model used in most digital computer programs for the simulations of machines.

J. The preferred embodiment is based upon a model of a machine with a balanced stator. This is unnecessary because an unbalanced three-phase machine could be simulated by making transformations of each of the three stator phases. This would involve six phase detectors (PFDD) and a modulated oscillator which provided reference sinusoids at 30° intervals. The latter could be accomplished by beginning with an oscillator whose frequency was 12 times as high as the desired final output frequency, and applying its output as the input to a "divide-by-three" circuit which would output three sinusoids, each separated by 120°, at four times the desired final frequency. These signals would then be applied to three binary "divide-by-two" circuits, yielding six sinusoids, each separated by 60°, at twice the desired frequency. These signals would be applied to six more "divide-by-two" circuits, resulting in 12 sinusoids each separated by 30°, at the desired final reference frequency.

K. The preferred embodiment is operated steady-state and does not require any initial conditions — it finds its own. This embodiment is appropriate to analog use but inappropriate to hybrid use (where the input data could be digital). In such a case, the preferred embodiment could be modified so as to accept initial conditions in each integrator of the circuit. But this is still inadequate because the initial rotor angle also needs to be specified. However, by the use of the "divide-by" technique, given above, a digital initial setting could be applied to the "divide-by" circuits, such that an initial rotor angle (quantized to the nearest 30°) could be pre-established. If any finer angle quantization were desirable, it could be accomplished by a similar countdown technique.

L. The preferred embodiment works from the applied voltages (rotor and stator) and the applied rotor torque to resulting currents and flux-linkages. Many other permutations of inputs are possible. For example, either the rotor or the stator could use voltage or current or flux-linkage as an input. The mechanical inputs could be torque or power or speed.

M. The preferred embodiment takes stator voltage, integrates it to stator flux-linkage, and then transforms to rotor coordinates to obtain $\lambda_d$ and $\lambda_q$. Alternatively, the device could also proceed to take transformations directly from the applied stator voltage. In this case, to follow the machine's model perfectly, so-called "transformer voltage" terms should then be added. However, by neglecting such voltages, the resulting configuration will be the same as the typical digital computer model for the machine and yield the (often desired) suppression of harmonics in the simulation.

N. The preferred embodiment assumes sinusoidal wave forms. It is believed that the device will also successfully work in the simulation of machines which are subject to non-sinusoidal wave forms.

APPENDIX

Derivation of the Fundamental Equations of a Synchronous Alternator

Background information may be found in (1) "- Definitions of Electrical Terms," approved by American Standards Association, May 21, 1956; published by Institute of Electrical and Electronic Engineers, New York; (2) Kimbark, E.W., *Power System Stability: Synchronous Machines*, Dover, New York (1968); and (3) Fitzgerald, A. E. and Kingsley, C., *Electric Machinery*, McGraw-Hill, New York (1961).

Basic Description of a Synchronous Alternator

Figure 12:
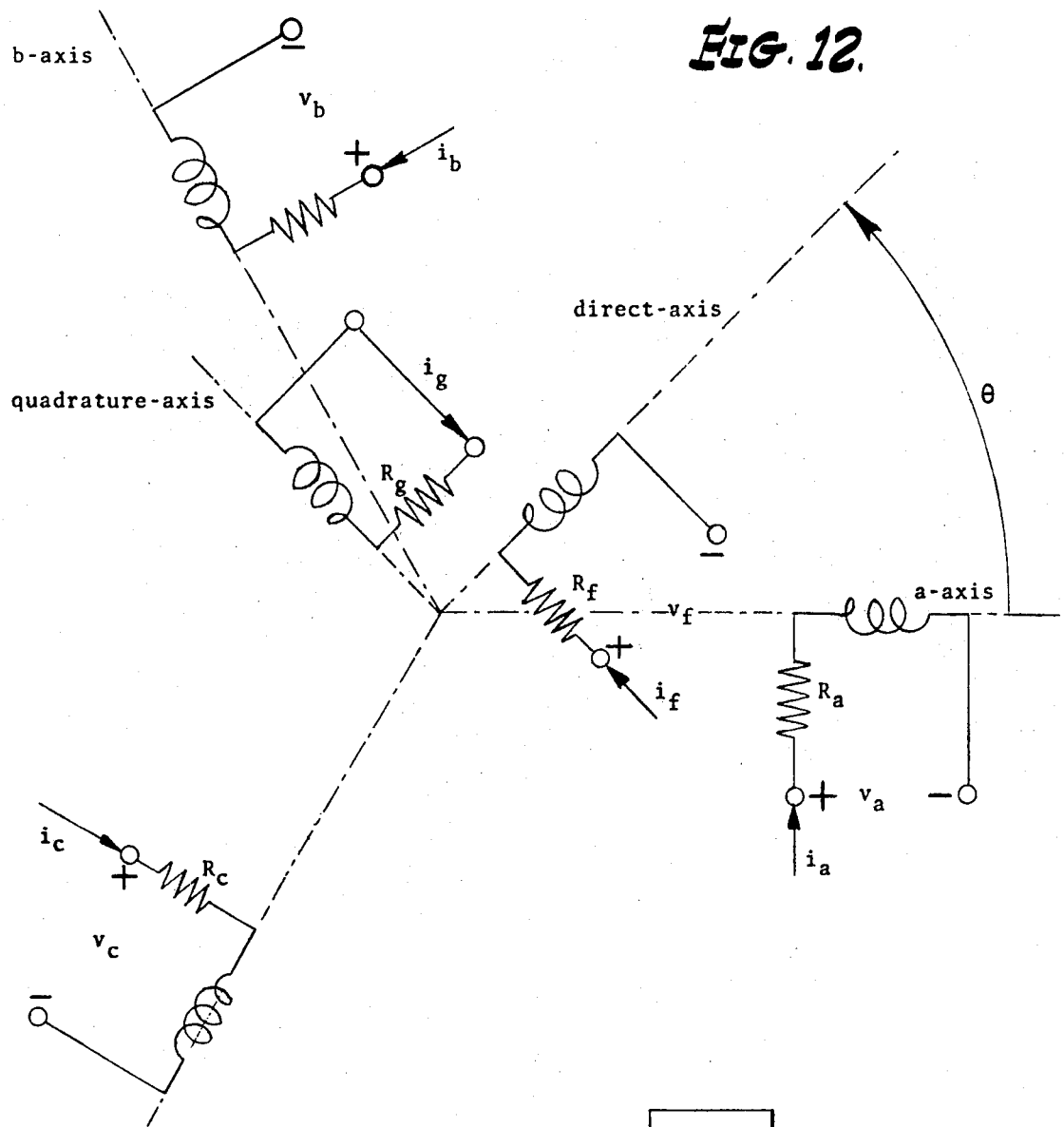
FIG. 12 is a diagram of a simplified synchronous alternator model used to analyze in the Appendix the behavior of a two-pole, three-phase synchronous alternator.

FIG. 12 is a sketch of a simplified model used to analyze the behavior of a two-pole, three-phase synchronous alternator for the class of transients normally encountered in power system stability studies. More complicated models have been proposed, particularly with regard to the number of rotor circuits used. It should be noted that the present method of simulating an alternator is by no means limited to the model given here; the model may be easily extended if a more complex representation of an alternator is desired. However, this model is believed to be sufficiently accurate for basic system analysis purposes, and illustrates the present concepts with a minimum of complexity. The alternator model shown in FIG. 12 has 3 armature coils $a$, $b$ and $c$ ("armature coils" and "stator coils" are used interchangeably); the alternator's rotor has one coil f in its direct axis, and a short circuited coil $g$ in its quadrature axis. The $f$ coil is the physical field winding; the $g$ coil is usually considered to be a fictitious winding, and is used to represent the effects of currents in metallic paths which are symmetrical around the $q$-axis. These paths may be in iron or in amortisseur bars. The rotor angle, $\theta$, of the alternator is measured from the armature's $a$-axis to the direct axis of the rotor. The present sign convention for all of the alternator's coils is such that for all coils:

$$v_k = R_k i_k + d\lambda_k/dt; \quad (1)$$
$$k = a, b, c, f, g.$$

Equation (1) describes, for each coil, $k$, the relationship between the coil's terminal voltage ($v_k$), resistance ($R_k$), current ($i_k$), and flux linkage ($\lambda_k$). In practice, the three armature coils generally have negligible resistance, and it is therefore assumed $$R_a = R_b = R_c \equiv 0 \quad (2)$$

Such an assumption is typically valid, but not necessary for the development; it is used herein to reduce complexity. The model has placed the three phase windings on the stator and the field winding on the rotor in conformity with the normal arrangement in ac synchronous machines. This model is also valid for ac synchronous machines in which the field winding is on the stator and the phase windings are on the rotor.

Flux Linkages as Functions of Currents, In Actual Coordinates

By definition, an ideal synchronous alternator has no magnetic saturation, i.e., is magnetically linear. Therefore the flux linkage in each coil can be related to a linear combination of the various currents, as follows $$\begin{bmatrix} \lambda_a \\ \lambda_b \\ \lambda_c \\ \lambda_f \\ \lambda_g \end{bmatrix} = \begin{bmatrix} L_{aa} & L_{ab} & L_{ac} & L_{af} & L_{ag} \\ L_{ba} & L_{bb} & L_{bc} & L_{bf} & L_{bg} \\ L_{ca} & L_{cb} & L_{cc} & L_{cf} & L_{cg} \\ L_{fa} & L_{fb} & L_{fc} & L_{ff} & L_{fg} \\ L_{ga} & L_{gb} & L_{gc} & L_{gf} & L_{gg} \end{bmatrix} \begin{bmatrix} i_a \\ i_b \\ i_c \\ i_f \\ i_g \end{bmatrix} \quad (3)$$

The various inductance terms, $L_{mn}$, in equation (3) are derived by Kimbark, cited above, and are given as follows:

$$L_{aa} = L_s + L_m \cos(2\theta) \quad (4)$$
$$L_{bb} = L_s + L_m \cos(2\theta + 120°) \quad (5)$$
$$L_{cc} = L_s + L_m \cos(2\theta - 120°) \quad (6)$$
$$L_{ab} = L_{ba} = -M_s + L_m \cos(2\theta - 120°) \quad (7)$$
$$L_{bc} = L_{cb} = -M_s + L_m \cos(2\theta) \quad (8)$$
$$L_{ca} = L_{ac} = -M_s + L_m \cos(2\theta + 120°) \quad (9)$$
$$L_{af} = L_{fa} = M_f \cos(\theta) \quad (10)$$
$$L_{bf} = L_{fb} = M_f \cos(\theta - 120°) \quad (11)$$
$$L_{cf} = L_{fc} = M_f \cos(\theta + 120°) \quad (12)$$
$$Lff = L_f \quad (13)$$

where $L_s$, $L_m$, $M_s$, $M_f$ and $L_f$ are constants. For notational simplicity, Kimbark's redundant double subscript on the field's self-inductance has been detected; that is, $L_f$ is used for Kimbark's $L_{ff}$.

At first Kimbark does not include the present quadrature axis coil, $g$, on the rotor. However, from FIG. 12, it is evident that coil g is analogous to coil $f$, except for being advanced by 90° on the rotor. Thus, the following quadrature axis inductance terms result from analogy with equations (10) through (13):

$$L_{ag} = L_{ga} = M_g \cos(\theta + 90°) \quad (14)$$
$$L_{bg} = L_{gb} = M_g \cos(\theta - 30°) \quad (15)$$
$$L_{cg} = L_{gc} = M_g \cos(\theta - 150°) \quad (16)$$
$$L_{gg} = L_g \quad (17)$$

where $M_g$ and $L_g$ are constants.

Finally, since coils $f$ and $g$ are orthogonal, they have no mutual coupling, and it follows that $$L_{fg} = L_{gf} = 0 \quad (18)$$

The Park Transform

The Part Transform, P, is a matrix transformation which accomplishes the transformation of stator coordinate variables (i.e., those quantities subscripted by $a$, $b$, $c$) into rotor coordinate variables having subscripts of $d$, $q$, $o$ and respectively identified as "direct axis," "quadrature axis" and "zero sequence" variables. By definition, the rotating coordinate variables are related to the stator coordinate variables by $$\begin{bmatrix} \xi_d \\ \xi_q \\ \xi_o \end{bmatrix} = P \begin{bmatrix} \xi_a \\ \xi_b \\ \xi_c \end{bmatrix} \quad (19)$$

where $\chi$ stands for any of the armature variables $v$, $i$, or $\lambda$, and where P is the transformation matrix for the Park Transform, given by $$P = \frac{2}{3} \begin{bmatrix} \cos(\theta) & \cos(\theta - 120°) & \cos(\theta + 120°) \\ -\sin(\theta) & -\sin(\theta - 120°) & -\sin(\theta + 120°) \\ \frac{1}{2} & \frac{1}{2} & \frac{1}{2} \end{bmatrix}$$

$$(20)$$

Note that the $\theta$ of equation (20), and the $\theta$ of FIG. 12, are the same angle. Equation (19) can be inverted to yield $$\begin{bmatrix} \xi_a \\ \xi_b \\ \xi_c \end{bmatrix} = P^{-1} \begin{bmatrix} \xi_d \\ \xi_q \\ \xi_o \end{bmatrix} \quad (21)$$

where $P^{-1}$ is the inverse Park-Transform matrix given by:

$$P^{-1} = \begin{bmatrix} \cos(\theta) & -\sin(\theta) & 1 \\ \cos(\theta - 120°) & -\sin(\theta - 120°) & 1 \\ \cos(\theta + 120°) & -\sin(\theta + 120°) & 1 \end{bmatrix} \quad (22)$$

Flux Linkages as Functions of Currents, in Park-Transformed Coordinates

The Park-transform has a very great advantage in that, when it is applied to the equation relating the flux linkages, inductances, and currents in a synchronous alternator (cf. equation 3 above), the resulting transformed equations contain no explicit dependence on the alternator's rotor angle, $\theta$. Specifically, if equations (3) through (20) are combined, and suitable trignometric manipulations are performed, then the result is equation (23) below, $$\begin{bmatrix} \lambda_d \\ \lambda_f \\ \lambda_o \\ \lambda_q \\ \lambda_g \end{bmatrix} = \begin{bmatrix} L_d & M_f & 0 & 0 & 0 \\ \frac{3}{2}M_f & L_f & 0 & 0 & 0 \\ 0 & 0 & L_o & 0 & 0 \\ 0 & 0 & 0 & L_q & M_g \\ 0 & 0 & 0 & \frac{3}{2}M_g & L_g \end{bmatrix} \begin{bmatrix} i_d \\ i_f \\ i_o \\ i_q \\ i_g \end{bmatrix} \quad (23)$$

where the following traditional definitions are employed:

$L_d \triangleq$ direct axis synchronous inductance $= L_s + M_s + (3/2)L_m$ (24)

$L_q \triangleq$ quadrature axis synchronous inductance $= L_s + M_s - (3/2)L_m$ (25)

$L_o \triangleq$ zero sequence inductance $= L_s - 2M_s$ (26)

It is also appropriate to note the relationship between other inductances ($M_f$, $L_f$, $M_g$, $L_q$) employed in equation (23), and traditionally defined quantities:

$L_d' \triangleq$ direct axis transient inductance $= L_d - 3M_f^2/2L_f$ (27)

$L_q' \triangleq$ quadrature axis transient inductance $= L_q - 3M_g^2/2L_g$ (28)

[Kimbark presents above equation (27) as his equation (150) on page 66. Unfortunately at this stage in his development he has not included the $g$ coil in his model. Consequently, he concludes (in the last paragraph on page 66) that $L_q' = L_q$, although he notes that this would not be true if there were a $g$ coil. Since the present model has a $g$ coil (cf. FIG. 2), the simplest way to derive the value of $L_q'$ is to consider the inductance to be analogous to $L_d'$. Specifically, since (cf. equation 27) $L_d'$ is reduced from $L_d$ by a term of $3M_f^2/L_f$, it can be analogized that $L_q'$ should be reduced from $L_q$ by a term of $3M_g^2/L_g$ to therefore obtain equation (28)].

Currents as Functions of Flux Linkages, In Park-Transformed Coordinates

Equation (23) gives an explicit formulation for flux linkages in terms of currents, in Park-Transformed coordinates. However, for purposes of describing the present simulation concepts, it is desirable to obtain an explicit formulation for currents in terms of flux linkages, in Park-Transformed coordinates. In order to derive the desired forumlation equation (23) is simply inverted to obtain equation (29) below, $$\begin{bmatrix} i_d \\ i_f \\ i_o \\ i_q \\ i_g \end{bmatrix} = \begin{bmatrix} \Gamma_{dd} & \Gamma_{df} & 0 & 0 & 0 \\ \Gamma_{fd} & \Gamma_{ff} & 0 & 0 & 0 \\ 0 & 0 & \Gamma_{oo} & 0 & 0 \\ 0 & 0 & 0 & \Gamma_{qq} & \Gamma_{qg} \\ 0 & 0 & 0 & \Gamma_{gq} & \Gamma_{gg} \end{bmatrix} \begin{bmatrix} \lambda_d \\ \lambda_f \\ \lambda_o \\ \lambda_q \\ \lambda_g \end{bmatrix} \quad (29)$$

where the $\Gamma$ matrix is the inverse of the matrix employed in equation (23). Using standard techniques for matrix inversion, and the definitions given by equations (25) through (28), it is found that the various $\Gamma_{mn}$ terms in equation (29) are as follows:

$\Gamma_{dd} = 1/L_d'$ (30)
$\Gamma_{ff} = L_d/L_f L_d'$ (31)
$\Gamma_{df} = \frac{2}{3}\Gamma_{fd} = -M_f/L_f L_d'$ (32)
$\Gamma_{qq} = 1/L_q'$ (33)
$\Gamma_{gg} = L_q/L_g L_q'$ (34)
$\Gamma_{qg} = \frac{2}{3}\Gamma_{gq} = -M_g/L_g L_q'$ (35)
$\Gamma_{oo} = 1/L_o$ (36)

Electromechanical Equations

As yet, the relationship between $\theta$, equals the angle of machine's rotor, (cf. FIG. 12) and $T_t$, equals the input mechanical torque applied to machine's rotor, has not been considered. In order to determine this relationship, it is noted that the electrical load on the machine causes a "back torque" (i.e., a torque which acts against the applied mechanical torque) which is described (for a two-pole machine) by:

$$T_b = (3/2)[\lambda_q i_d - \lambda_d i_q] \quad (37)$$

The total torque acting on the machine's rotor will therefore be $$T = T_t - T_b \quad (38)$$

Assuming that mechanical damping effects are negligible, Newtonian physics require that.

$$T = J\, d^2\theta/dt^2 \quad (39)$$

where J is equal to the moment of intertia of the rotating mass. The rotating mass is the total mass which rotates with the rotor of the alternator; it includes the mass of both the alternator's rotor and the turbine's rotor, and may include other masses as well. Combining equations (37) through (39) yields the desired relationship between the rotor angle and the input mechanical torque.

$$d^2\theta/dt^2 = (1/J) [T_i + (3/2)(\lambda_d i_q - \lambda_q i_d)] \quad (40)$$

Finally, for purposes of subsequent analysis, $\theta$ will be defined as:

$$\theta = \omega_B t + \psi(t) \quad (41)$$

where $\omega_B$ is equal to the nominal (or base) rotational frequency of the rotor (rad/sec) and where $\psi(t)$ is a time variant phase angle. It is important to note that, under the present assumption of a two-pole rotor, $\omega_B$ is also given by $\omega_B$ = nominal (or base) electrical frequency of alternator (rad/sec).

Assumption of Balanced Operation and the Equations which Result from this Assumption Almost all large scale digital simulations of power networks assume balanced operation; for the present purposes balanced operation will also be assumed. The assumption of balanced operation requires that the voltage magnitudes of each of the three stator coils (coils $a$, $b$, and $c$ in FIG. 12) be identical, and that the voltage of coil $a$ leads the voltage of coil $b$ by 120°, and lags the voltage of coil $c$ by 120°. The definitions of Electrical Terms noted earlier also requires a similar relationship to exist among the three stator currents in the definition of balanced operation. Finally, since the ideal machine has a linear, time independent relationship between flux linkages and currents [cf. equation (3)], a similar relationship will also exist among the three stator flux linkages.

The assumption of balanced operation permits a considerable simplification in both the analysis and simulation of a power network since, under this assumption: (1) Voltages, current or flux linkages need only be computed (or simulated) for one of the stator coils (e.g. for the $a$ coil); and (2) The corresponding quantities for the other coils (e.g. the $b$ and $c$ coils) can be evaluated by simple phase shifting the results obtained for the first coil. Using the balanced assumption, the three stator flux linkages (in stator coordinates) can be characterized as $$\lambda_a = \Lambda(t) \cos[\omega_B t + \phi(t)] \quad (42)$$
$$\lambda_b = \Lambda(t) \cos[\omega_B t + \phi(t) - 120°] \quad (43)$$
$$\lambda_c = \Lambda(t) \cos[\omega_B t + \phi(t) + 120°] \quad (44)$$

where, as discussed above under Electromechanical Equations, $\omega_B$ is equal to the nominal (or base) electrical frequency of alternator (rad/sec), and where $\Lambda(t)$ and $\phi(t)$ are time variant, presently undetermined quantities.

Equations (42), (43) and (44) show the three stator flux linkages to be identical, except for constant phase shifts of ±120°. These equations are sufficient to impose the assumption of balanced operation on the present model of the alternator.

Applying the Park-Transform equations, (19) and (20), and the definition of equation (41) to the flux linkage equations, (42) through (44), yields $$\lambda_d = \Lambda(t) \cos[\phi(t) - \psi(t)] \quad (45)$$
$$\lambda_q = \Lambda(t) \sin[\phi(t) - \psi(t)] \quad (46)$$

$$\lambda_o = 0 \quad (47)$$

Now noting from (29) that, in general, $$i_o = \Gamma_{oo} \lambda_o \quad (48)$$

it is found from (47) and (48) that, under the assumption of balanced operation, $$i_o = 0 \quad (49)$$

Finally, using equations (21) and (22) it is found that, in general, $$i_a = i_d \cos(\theta) - i_q \sin(\theta) + i_o \quad (50)$$

so that under the assumption of balanced operation, equations (49) and (50) combine to yield $$i_a = i_d \cos(\theta) - i_q \sin(\theta) \quad (51)$$

Summary of the Fundamental Equations of an Ideal Alternator, Assuming Balanced Operation Using the results of the previous analysis, the fundamental equations of an ideal alternator will now be presented, assuming balanced operation. The rotor equations can be obtained directly from equation (1), with the field coil characterized by $$v_f = R_f i_f + d\lambda_f/dt \quad (52)$$

and the amortisseur coil (which has a zero value of terminal voltage) characterized by $$0 = R_g i_g + d\lambda_g/dt \quad (53)$$

Under the assumption of balanced operation, it is only necessary to simulate the operation of the $a$ stator coil. For this coil, equations (1) and (2) give the terminal voltage as $$v_a = d\lambda_a/dt \quad (54)$$

while equation (51) gives the current as $$i_a = i_d \cos(\theta) - i_q \sin(\theta) \quad (55)$$

In equation (55), $\theta$ is the machine's rotor angle [cf. FIG. 12] defined by (41) as $$\theta = \omega_B t + \psi \quad (56)$$

where $\omega_B$ is equal to the nominal (or base) rotational frequency of rotor, or electrical frequency of alternator (rad/sec), and $\psi$ is a presently undetermined phase angle. The differential equation for $\theta$ is given by (40) as $$d^2\theta/dt^2 = (1/J)[T_i + (3/2)(\lambda_d i_q - \lambda_q i_d)] \quad (57)$$

where J is equal to the moment of inertia of the rotating mass, and $T_i$ is equal to the input mechanical torque applied to machine's rotor.

Now consider the $d$-$q$ parameters. All $o$ parameters have zero values in balanced operation, and are not considered further. The current vs. flux linkage equations are obtained from (29) as $$i_d = \Gamma_{dd}\lambda_d + \Gamma_{df}\lambda_f \quad (58)$$
$$i_f = \Gamma_{fd}\lambda_d + \Gamma_{ff}\lambda_f \quad (59)$$
$$i_q = \Gamma_{qq}\lambda_q + \Gamma_{qg}\lambda_g \quad (60)$$
$$i_g = \Gamma_{gq}\lambda_q + \Gamma_{gg}\lambda_g \quad (61)$$

where the $\Gamma$'s are constants given by equations (30) through (36). The values of the $\Gamma$'s will be related to specified, machine constants subsequently. The $d$-$q$ and $a$ values of $\lambda$ are related as described by (42), (45) and (46), viz, $$\lambda_a = \Lambda \cos[\omega_B t + \phi] \quad (62)$$
$$\lambda_d = \Lambda \cos(\phi - \psi) \quad (63)$$
$$\lambda_q = \Lambda \sin(\phi - \psi) \quad (64)$$

where $\Lambda$ and $\phi$ are presently undetermined, time variant parameters.

It may be shown that the above-listed equations are sufficient to characterize the balanced operation of an ideal alternator for purposes of simulation, when the following alternator input parameters (determined by the system external to the alternator) are specified, $v_f$ = the terminal voltage of the rotor field coil
$v_a$ = the terminal voltage of the "a" stator coil
$T_i$ = the input mechanical torque applied to the alternator rotor shaft and the following alternator constants are specified all $\Gamma$'s, $J$, $R_f$, $R_g$, $\omega_B$.

The value of leakage inductance is customarily specified when characterizing an alternator. However, for an ideal alternator, leakage flux is assumed to be zero. Consequently, for the present purposes, the effects of leakage inductance are ignored. Continuing with the derivation of fundamental equations, per-unitization of such equations will now be discussed below.

Per-Unitization of the Fundamental Equations

Introduction

Most analyses of power systems are carried out in per-unit, i.e., with all quantities expressed in dimensionless form as fractions of some specified, corresponding base value. The fundamental relation for calculating per-unit values is Quantity in per unit = (actual quantity/base value of quantity) (65)

where "actual quantity" refers to the actual value of the quantity as expressed in volts, amps, ohms, etc. The only constraints imposed herein upon the choice of base values are the following:

1. The ensemble of base values must satisfy the normal electrical and mechanical relationships. For example, we must have $$R_{Base} = X_{Base} = V_{Base}/I_{Base} \quad (66)$$

2. The base values must be such that all angles remain invariant under the per-unitization procedure. For example, if an actual alternator equation defines an angle, $\eta$, as $$\eta = \omega t \quad (67)$$

then the base values of $\omega$ and $t$ must be chosen so that $$\eta = \omega_{pu} t_{pu} \quad (68)$$

i.e., so that the same angle results from the per-unitized equation as from the actual equation.

The first constraint above is specified by Fitzgerald and Kingsley; the second constraint is a natural concomitant of the desire to have each phase angle in this simulation be numerically equal to the corresponding phase angle in the actual alternator.

The alternator equations (summarized in the previous section) will now be converted to per-unit form, using the fundamental relation of (65) above, and the just discussed constraints on the choice of base values. The per-unit analysis to be described will accomplish the following: (1) It will permit all gain constants required for the simulation to be evaluated in terms of the specified alternator parameters (most of which are customarily specified in per-unit form): and (2) It will provide an easy method for scaling the alternator parameters so as to conveniently represent them in the simulation.

Information Typically Specified by Power Utilities for Characterizing a Synchronous Alternator When characterizing a synchronous alternator, industry usage will usually specify the following base value quantities:

$V_B$ = base value of rms terminal voltage for each stator coil of the alternator
$P_B$ = base value of total output power from the alternator
$\omega_B$ = base value of radian electrical frequency of the alternator In the USA, $\omega_B$ almost always has a value of $2\pi \times 60$ rad/sec. Consequently, the value of $\omega_B$ is customarily assumed, rather than explicitly specified.

It may be shown that all other base values (e.g. the base values of resistance, flux linkage, etc.) can be expressed in terms of the three base values given above. However, it is more convenient to define an additional set of base values for the rotor field circuit, rather than using the base values listed above. Specifically, it is normal to define the base values of field current and field voltage to be the following:

$I_{fB}$ = base value of field current
= that value of field current which causes the stator rms terminal voltage to equal its base value, when the stator terminals are open circuited and the machine is in the steady state with an electrical radian frequency of $\omega_B$ (a non-saturating alternator model is assumed).

$V_{fB}$ = base value of field voltage
= that value of rotor terminal voltage which results when $i_f = I_{fB}$, and when the conditions are the same as those specified in the definition of $I_{fB}$.

It has previously been noted that specification of three primary base values [$V_B$, $P_B$, and $\omega_B$] is sufficient to characterize the base values of all other parameters in the system. It would therefore appear that the independent specification of additional base values for the rotor would cause inconsistencies in the per-unitization procedure. However, such inconsistencies do not occur in practice because there are two parameter values ($M_f$ and $R_f$) which are never explicitly specified by the utilities. It is therefore possible to both (a) obtain the correct values of $M_f$ and $R_f$, and (b) make all five base values consistent, by solving for the particular values of $M_f$ and $R_f$ which cause the base values to be consistent.

In addition to specifying the five, above-described base values, the following per-unitized parameter values are specified:

$X_{dpu}$ = per-unit value of direct axis synchronous reactance $$= X_d/X_B = \omega_B L_d/X_B \quad (69)$$

Leakage reactance is also specified but, as previously discussed in this specification, will be ignored.

$X_{qpu}$ = per-unit value of quadrature axis synchronous reactance $$= X_q/X_B = \omega_B L_q/X_B \quad (70)$$

$X'_{dpu}$ = per-unit value of direct axis transient reactance $$= X_d'/X_B = \omega_B L_d'/X_B \quad (71)$$

$X'_{qpu}$ = per-unit value of quadrature axis transient reactance $$= X_q'/X_B = \omega_B L_q'/X_B \quad (72)$$

In equations (69) through (72) above, $X_B$ is the base value of reactance (which can be related to $V_B$ and $P_B$), and $L_d$, $L_q$, $L_d'$ and $L_q'$ are various inductances which have already been defined.

It is now appropriate to identify the following non-per-unit parameter values which are typically specified by the utilities for purposes of completing the characterization of an alternator:

$T_{do}'$ = direct axis transient open circuit time constant
$$= L_f/R_f \text{ (dimensions of time)} \quad (73)$$

$T_{qo}'$ = quadrature axis transient open circuit time constant
$$= L_g/R_g \text{ (dimensions of time)} \quad (74)$$

$H_C$ = inertia constant
 = the kinetic energy of the rotating mass at synchronous speed
$$= \tfrac{1}{2} J\omega_B^2 \text{ (dimensions of energy)} \quad (75)$$

This definition is appropriate, since, under the present assumption of a two-pole rotor, $\omega_B$ is the base value of mechanical rotational frequency as well as electrical frequency (cf. discussion following equation (41)). The quantities, $L_f$, $R_f$, $L_g$, $R_g$ and $J$ which appear in equations (73) through (75) above, have all been identified above.

Finally, the following assumptions will be made about the alternator which is to be simulated:

1. All alternator parameters which are either inputs or outputs of the alternator will be specified in per-unit.
2. The numerical values of $$X_{dpu}, X_{qpu}, X'_{dpu}, X'_{qpu}, T'_{do}, T'_{qo} \text{ and } H_C$$

will be specified.

3. The base values employed in all per-unit specifications will be defined identically to the five base values discussed in this subsection.

Evaluation of $R_f$ and $M_f$ as Functions of the Specified Base Values

As mentioned previously, the specification of five (rather than three) base values is tantamount to the specification of the values of $R_f$ and $M_f$. In this subsection the values of $R_f$ and $M_f$ will be calculated as functions of the specified base values. In order to evaluate $R_f$, the resistance of the field coil, first consider the rotor field equation given by equation (52), viz $$v_f = R_f i_f + d(\lambda_f)/dt \quad (76)$$

Next, consider equation (76) in the steady state, i.e., when $\lambda_f$ is a constant. In this state, (76) reduces to $$v_f = R_f i_f \quad (77)$$

But, using the definitions of the rotor base values given previously, the following relation must hold in the steady state:

$$v_f = V_{fB}, \quad (78)$$

when $i_f = I_{fB}$.
Since (77) must hold under the conditions specified by (78), $$V_{fB} = R_f I_{fB} \quad (79)$$

and the final result that $$R_f = V_{fB}/I_{fB} \quad (80)$$

$M_f$, which describes the coupling between the $f$-coil of the rotor and the stator coils (cf. equations 10, 11 and 12) will now be evaluated. First note from Kimbark that $$v_d = +ri_d + M_f(di_f/dt) + L_d(di_d/dt) - \omega M_g i_g - \omega L_q i_q \quad (81)$$

$$v_q = +ri_q + M_g(di_g/dt) + L_q(di_q/dt) + \omega M_f i_f + \omega L_d i_d \quad (82)$$

where $r$ is the resistance of each stator coil, $v_d$ and $v_q$ are the Park-Transformed stator terminal voltages, and all other quantities have been defined previously. The referenced equations have algebraic signs of $i_d$ and $i_q$ which are reversed from those in equations (81) and (82) above. This is because Kimbark reversed his sign convention at the start of his page 73, making it the opposite of the present sign convention and his previous sign convention. In the present notation (cf. equation (2)), $r = R_a = R_b = R_c$. Now consider equations (81) and (82) under the conditions employed in the definition of $I_{fB}$ and $V_{fB}$, viz, when the stator terminals are open circuited and the alternator is in the steady state with an electrical radian frequency of $\omega_B$. Under these conditions $$\omega = \omega_B \quad (83)$$

and, since the terminals are open circuited, $$i_d = i_q = 0 \quad (84)$$

Also, $$i_g = di_f/dt = 0 \quad (85)$$

since the alternator is in the steady state. Note that this condition implies that the net stator field rotates in synchronism with the physical rotor of the alternator (more specifically, the net stator field vector is at a constant angle relative to the physical rotor). Consequently, there is no current induced by the stator field into either the $f$ or $g$ coils of the rotor, and the only current in either rotor coil is the constant current in the $f$ coil caused by the applied field voltage, $v_f$.

Substituting (83) through (85) into (81) and (82) yields the steady state open circuited stator values of $v_d$ and $v_q$ as $$[v_d]_{ss} \text{ open circuit} = 0 \quad (86)$$

$$[v_q]_{ss} \text{ open circuit} = \omega_B M_f i_f \quad (87)$$

Now calculating $v_a$ from $v_d$ and $v_q$, by using the inverse Park-Transform (cf. equations (21) and (22)), $$[v_a]_{ss} \text{ open circuit} = -\omega_B M_f i_f \sin(\theta) \quad (88)$$

Use of (56) in (88) yields $$[v_a]_{ss} \text{ open circuit} = -\omega_B M_f i_f \sin(\omega_B t + \psi) \quad (89)$$

Of particular interest in the rms value of (89), which is given by $$[v_a]_{rms}, \text{ ss, open circuit} = \omega_B M_f i_f / \sqrt{2} \quad (90)$$

Note that, in the steady state, $\psi$ is a constant. Consequently, the rms value of $\sin(\omega_B t + \psi)$ is $1/\sqrt{2}$. But, from the definition of $I_{fB}$ (= the base value of field current), it is known that $$[v_a]_{rms}, \text{ ss, open circuit} = V_B, \quad (91)$$

when $i_f = I_{fB}$
Consequently, from (90) and (91), $$V_B = \omega_B M_f I_{fB}/\sqrt{2} \quad (92)$$

which gives us the final result that $$M_f = \sqrt{2} V_B/\omega_B I_{fB} \quad (93)$$

Evaluation of Other, Required Base Values for Stator Variables

The base values of voltage ($= V_B$) and power ($= P_B$) for the stator variables have been specified. Note that the specification of the base value of power applies to the output power, which is measured at the stator terminals. The power base value therefore applies to the stator (as contrasted with the rotor) variables. However, in order to per-unitize all stator variables, expressions for the base values of current, resistance, reactance and flux linkage also are needed. In this subsection, these required base values will be evaluated, using the fundamental dictum that all base values must satisfy the normal electrical relationships.

First, consider the relationship between power, voltage and current for the stator variables. Note that the definition of the base value of power ($= P_B$) applies to the total alternator, whereas the base value of rms voltage ($= V_B$) applies to only one (of the three) stator coils of the alternator. Consequently, if we define (in analogy to the definition of $V_B$), $I_B$ = base value of rms terminal current for each stator coil of the alternator then, since each stator coil generates one-third of the total alternator power, $$V_B I_B = P_B/3 \qquad (94)$$

or $$I_B = P_B/3V_B \qquad (95)$$

Since, the base values of resistance ($= R_B$) and reactance ($= X_B$) for the stator circuit must satisfy normal electrical relationships, $$R_B = X_B = V_B/I_B \qquad (96)$$

Now consider the following, normal electrical relationships between inductance ($= L$), reactance ($= X$), flux linkage ($= \lambda$), current ($= i$) and frequency ($= \omega$):

$$X = \omega L \qquad (97)$$

$$\lambda = Li \qquad (98)$$

Combination of these equations yields $$\lambda = Xi/\omega \qquad (99)$$

Consequently, the base value of rms flux linkage for the stator ($= \Lambda_B$) must be given by $$\Lambda_B = X_B I_B/\omega_B \qquad (100)$$

which reduces with the aid of (96) to $$\Lambda_B = V_B/\omega_B \qquad (101)$$

Evaluation of Other, Required Base Values of Rotor Variables

As discussed previously, different base values are specified for the stator and rotor variables. In this subsection the rotor variables will be considered and the specified base values of rotor current ($= I_{fB}$) and rotor voltage ($= V_{fB}$) will be used to calculate all other required rotor base values.

In analogy with equation (96) for the stator variables, the base values of rotor resistance ($= R_{fB}$) and rotor reactance ($= X_{fB}$) are given by $$R_{fB} = X_{fB} = V_{fB}/I_{fB} \qquad (102)$$

Furthermore, in analogy with equation (101) for the stator variables, the base value of flux linkage for the rotor ($= \Lambda_{fB}$) is given by $$\Lambda_{fB} = V_{fB}/\omega_B \qquad (103)$$

Evaluation of the Base Values of Time and Torque

The base value of time is easily obtained from the constraint that all angles must remain invariant under the per-unitization procedure. Under this constraint, any angle, $\eta$, must simultaneously satisfy $$\eta = \omega t \qquad (104)$$

$$\eta = \omega_{pu} t_{pu} \qquad (105)$$

so that $$\omega_{pu} t_{pu} = \omega t \qquad (106)$$

Equation (106) can be rewritten, using (65), as $$(\omega/\omega_B)(t/t_B) = \omega t \qquad (107)$$

Solution of (107) shows the base value of time to be $$t_B = 1/\omega_B \qquad (108)$$

The base value of torque will now be calculated. From elementary physics it is known that the relationship between power ($= P$), torque ($= T$) and rate of change of angle ($= d\theta/dt$), is $$P = T(d\theta/dt) \qquad (109)$$

Rewriting (109) yields $$d\theta = (P/T) dt \qquad (110)$$

But from the postulated constraints on base values, angles must remain invariant under per-unitization. Consequently, the per-unit equation corresponding to (110) must also be valid, i.e., we must have $$d\theta = (P_{pu}/T_{pu}) dt_{pu} \qquad (111)$$

Using the definition of per-unit quantities given by (65), (111) can be rewritten as $$d\theta = \frac{P/P_B}{T/T_B} d(t/t_B) = \left[\frac{T_B \omega_B}{P_B}\right] \frac{P}{B} dt \qquad (112)$$

where the last equality of (112) has made use of (108). Simultaneous solution of (110) and (112) requires that the base value of torque be given by $$T_B = P_B/\omega_B \qquad (113)$$

Summary of Relationships Between Per-Unit and Actual Values of Most Variables of Interest In this subsection the per-unit and actual value of most of the variables of interest will be related, using the fundamental definition of per-unit values given by (65) and the previously derived base values for these variables. The only variables not considered here are the amortisseur variables (i.e., those variables subscripted with $g$), which will be discussed subsequently. The results of this subsection will provide the means for directly converting most of the fundamental, alternator equations into per-unit form.

First consider the stator variables. For all variables we will use $V_B$ = base value of voltage
$P_B$ = base value of power
$I_B$ = base value of current
$\Lambda_B$ = base value of flux linkage
$R_B = X_B$ = base value of resistance or reactance where $V_B$ and $P_B$ are specified base values, and all the other base values listed above are related to $V_B$ and $P_B$ by earlier equations. Using the per-unit definition of (65) and the appropriate previous equations $$v_{apu} = v_a/V_B \quad (114)$$

$$i_{apu}/i_a = i_{dpu}/i_d = i_{qpu}/i_q = 1/I_B = 3V_B/P_B \quad (115)$$

$$\lambda_{apu}/\lambda_a = \lambda_{dpu}/\lambda_d = \lambda_{qpu}/\lambda_q = \Lambda_{pu}/\Lambda = 1/\Lambda_B = \omega_B/V_B \quad (116)$$

Now consider the rotor variables. For all rotor variables we will use $V_{fB}$ = base value of voltage
$I_{fB}$ = base value of current
$\Lambda_{fB}$ = base value of flux linkage
$R_{fB} = X_{fB}$ = base value of resistance or reactance where $V_{fB}$ and $I_{fB}$ are specified base values, and all the other base values listed above are related to $V_{fB}$ and $I_{fB}$ by earlier equations. Using the per-unit definition of (65) and the appropriate equations we therefore have $$v_{fpu} = V_f/V_{fB} \quad (117)$$

$$i_{fpu} = i_f/I_{fB} \quad (118)$$

$$\lambda_{fpu} = \lambda_f/\Lambda_{fB} = \omega_B\lambda_f/V_{fB} \quad (119)$$

$$R_{fpu} = R_f/R_{fB} = R_f I_{fB}/V_{fB} = 1 \quad (120)$$

where the last equality of (120) has made use of (102). Now consider the time ($= t$) and torque ($= T$) variables. Using (65) and earlier results, $$t_{pu} = t/t_B = \omega_B t \quad (121)$$

$$T_{pu} = T/T_B = \omega_B T/P_B \quad (122)$$

Per-Unitization of All Alternator Equations Not Involving Amortisseur Variables In this subsection all alternator equations not involving amortisseur variables (i.e., all equations not involving quantities subscripted with $g$) will be per-unitized. The per-unitization of the amortisseur equations will be deferred until the next subsection, since an appropriate system of base-values for the amortisseur variables must be chosen before the amortisseur equations can be per-unitized.

The first equation to be per-unitized is (52), which can be rewritten as $$v_f dt = R_f i_f dt + d\lambda_f \quad (123)$$

Multiplying both sides of (123) by $\omega_B/V_{fB}$ yields $$(v_f/V_{fB}) d(\omega_B t) = (R_f i_f/V_{fB}) d(\omega_B t) + d(\omega_B \lambda_f/V_{fB}) \quad (124)$$

But, reference to equations (117), (119) and (121) shows that (124) can be written as $$v_{fpu} dt_{pu} = (R_f i_f/V_{fB}) dt_{pu} + d(\lambda_{fpu})$$
$$= (i_f/I_{fB}) dt_{pu} + d(\lambda_{fpu})$$
$$= i_{fpu} dt_{pu} + d(\lambda_{fpu}) \quad (125)$$

where the second equality of (125) has used (120), and the third equality of (125) has used (118). Equation (125) can now be written as $$v_{fpu} = i_{fpu} + d/dt_{pu}(\lambda_{fpu}) \quad (126)$$

which is the final per-unitized form of (52).

Now consider equation (54), which can be written as $$v_a dt = d\lambda_a \quad (127)$$

Multiplying (127) by $(\omega_B/V_B)$ yields $$(V_a/V_B) d(\omega_B t) = d(\lambda_a \omega_B/V_B) \quad (128)$$

Use of (114), (116) and (121) shows that (128) can be written in final, per-unitized form as $$v_{apu} = d/dt_{pu} (\lambda_{apu}) \quad (129)$$

Equation (55) is easily per-unitized, via (115), to yield $$i_{apu} = i_{dpu} \cos(\theta) - i_{qpu} \sin(\theta) \quad (130)$$

Equation (56) is also easily per-unitized, via (121) and the fundamental dictum that all angles are invariant under per-unitization, to yield $$\theta = t_{pu} + \psi \quad (131)$$

Now consider equation (57), which can be written as $$d^2\theta/dt^2 = (\omega_B^2/2H_c) [ T_i + (3/2) (\lambda_d i_q - \lambda_q i_d) ] \quad (132)$$

where the value of $J$ in (57) has been expressed in terms of the inertia constant, $H_c$, by means of (75). First note that we can write $$\frac{d^2\theta}{dt^2} = \frac{d}{dt}\left(\frac{d\theta}{dt}\right) = \omega_B^2 \left[\frac{d}{d(\omega_B t)}\left(\frac{d\theta}{d(\omega_B t)}\right)\right] = \omega_B^2 \frac{d^2\theta}{dt_{pu}^2} \quad (133)$$

where the last equality of (133) has used (121). Substitution of (133) into (132) and multiplication of the resulting equation by $(1/\omega_B^2)$ yields $$\left[\frac{d^2\theta}{dt_{pu}^2}\right] = \frac{1}{2H_C}[Ti + (\lambda_d i_q - \lambda_q i_d)]$$
$$= \frac{P_B}{2\omega_B H_C}\left[\frac{T_i \omega_B}{P_B} + \frac{3}{2}\left(\frac{\lambda_d i_q \omega_B}{P_B} - \frac{\lambda_q i_d \omega_B}{P_B}\right)\right] \quad (134)$$

But, from (122), (115) and (116):

$$T_i \omega_B/P_B = T_{ipu} \quad (135)$$

$$\lambda_d i_q \omega_B/P_B = \lambda_{dpu} i_{qpu}/3 \quad (136)$$

$$\lambda_q i_d \omega_B/P_B = \lambda_{qpu} i_{dpu}/3 \quad (137)$$

Using these equations, (134) reduces to $$d^2\theta/dt_{pu}^2 = (P_B/2\omega_B H_C) [ T_{ipu} + \tfrac{1}{2} (\lambda_{dpu} i_{qpu} - \lambda_{qpu} i_{dpu}) ] \quad (138)$$

Now consider the first two $\Gamma$ equations, given by (58) and (59). Using (30) and (32), we can write (58) as $$i_d = (1/L_d') \lambda_d - (M_f/L_f L_d') \lambda_f \quad (139)$$

Substituting (71), (73) and (93) in (139) yields $$i_d = (\omega_B \lambda_d/X_B X'_{dpu}) - (\sqrt{2} V_B \lambda_f \omega_B/I_{fB} X_B X'_{dpu} R_f T'_{do} \omega_B) \quad (140)$$

Dividing (140) by $I_B$, and using (115) and (116), yields $$i_{dpu} = (\lambda_{dpu}/X'_{dpu}) - (\sqrt{2} \lambda_f \omega_B/I_{fB} R_f T'_{do} \omega_B X'_{dpu}) \quad (141)$$

But the conjunction of (80) and (119) yields $$\lambda_f \omega_B/I_{fB} R_f = \lambda_{fpu} \quad (142)$$

so that (141) becomes $$i_{dpu} = (1/X'_{dpu}) \lambda_{dpu} - (\sqrt{2}/\omega_B T'_{do} X'_{dpu}) \lambda_{fpu} \quad (143)$$

The next $\Gamma$ equation, (59), can be written with the aid of (31) and (32) as $$i_f = (-3M_f/2L_f L'_d) \lambda_d + (L_d/L_f L'_d) \lambda_f \quad (144)$$

In order to convert (144) to per-unit form we note from (69) and (71) that, $$L_d/L'_d = X_{dpu}/X'_{dpu} \quad (145)$$

from (27) and (145) that, $$3M^2_f/2L_fL_d' = (L_d - L'_d)/L'_d = (X_{dpu} - X'_{dpu})/X'_{dpu} \quad (146)$$

and from (73) and (102) that $$L_f = R_fT'_{do} = (V_{fB}/I_{fB}) T'_{do} \quad (147)$$

Substituting (145) through (147) into (144) yields $$i_f = -[X_{dpu} - X'_{dpu}]/X'_{dpu} (\lambda_d/M_f) \pm X_{dpu}I_{fB}\lambda_g/X'_{dpu}V_{fB}T'_{do} \quad (148)$$

Using (93), and dividing by $I_{fB}$, converts (148) to $$i_f/I_{fB} = -[X_{dpu} - X'_{dpu}]/\sqrt{2}X'_{dpu}[\omega_B\lambda_d/V_B] \pm X_{dpu}/X'_{dpu}\omega_BT'_{do}[\omega_B\lambda_f/V_{fB}] \quad (149)$$

Use of (116), (118) and (119) in (149) yields the final form of the per-unitized version of (59):

$$i_{fpu} = \frac{-[X_{dpu} - X'_{dpu}]}{\sqrt{2}X'_{dpu}} \lambda_{dpu} + \frac{X_{dpu}}{X'_{dpu}\omega_BT'_{do}} \lambda_{fpu} \quad (150)$$

To conclude this subsection, we use equations (116) and (121) to per-unitize (62) through (64), thereby obtaining $$\lambda_{apu} = \Lambda_{pu} \cos[t_{pu} + \phi] \quad (151)$$
$$\lambda_{dpu} = \Lambda_{pu} \cos(\phi - \psi) \quad (152)$$
$$\lambda_{qpu} = \Lambda_{pu} \sin(\phi - \psi) \quad (153)$$

Note that, in the derivation of (151) through (153), we have utilized the fundamental dictum that angles are invariant under per-unitization.

Per-Unitization of the Amortisseur Equations

Per-unitization of the amortisseur equations (i.e., those equations involving parameters having $g$ subscripts) presents a special problem because there is no standard definition of amortisseur base current to help compute the values of $R_g$ and $M_g$. (Recall that for the field circuit, the definitions of $I_{fB}$ and $V_{fB}$ were used to calculate $R_f$ and $M_f$, in equations (80) and (93) respectively.) It turns out that $R_g$ and $M_g$ never need to be explicitly evaluated, since the amortisseur variables are not needed as system outputs and the effects of the amortisseur could be included (in a linear model) without need for explicit representation of the amortisseur variables. However, in order to facilitate the ease with which the present simulator can be adapted to represent non-linear models of an alternator, the amortisseur variables are explicitly represented in the basic simulation described herein.

In this subsection the per-unitized amortisseur equations are derived in a heuristic and extremely simple manner: by direct analogy to the field equations, which have been previously derived. In the next subsection the results of this derivation will be shown to provide proper per-unitized values for all system outputs.

The philosophy for the heuristic derivation consists of simple replacing $d$ by $q$, and $f$ by $g$, in the subscripts of all per-unitized field equations, with the sole exception that $v_{gpu}$ is required to equal zero since the amortisseur has a zero valued terminal voltage. There is some justification for this substitution, since the amortisseur axis is co-linear with the $q$ axis, while the field axis is co-linear with the $d$ axis (cf. FIG. 12). Implementing this philosophy on the field equations, (126), (143) and (150), yields $$0 = i_{gpu} + d/dt_{pu} (\lambda_{gpu}) \quad (154)$$

$$i_{qpu} = (1/X'_{qpu}) \lambda_{qpu} - (\sqrt{2}/\omega_BT'_{qo}X'_{qpu}) \lambda_{gpu} \quad (155)$$

$$i_{gpu} = \frac{-[X_{qpu} - X'_{qpu}]}{\sqrt{2}X'_{qpu}} \lambda_{qpu} + \frac{X_{qpu}}{X'_{qpu}\omega_BT'_{qo}} \lambda_{gpu} \quad (156)$$

Justification of the Per-Unitized Amortisseur Equations

In this subsection it will be shown that the per-unitized amortisseur equations which were heuristically derived in the previous subsection, actually do satisfy the proper per-unit equations for the output variables $\lambda_{qpu}$ and $i_{qpu}$ (which are the only output variables directly affected by the amortisseur variables). First note that the conjunction of (33), (35) and (60) yields, $$i_q = (\lambda_q/L_q') - (M_g/L_gL_q') \lambda_g \quad (157)$$

The conjunction of (34), (35) and (61) yields $$i_g = -(3M_g/2L_gL_q') \lambda_q + (L_q/L_gL_q') \lambda_g \quad (158)$$

Furthermore note that (53) can be written as, $$i_g = -(1/R_g) (d\lambda_g/dt) \quad (159)$$

(74) can be written as $$L_g = R_gT'_{qo} \quad (160)$$

and (28) can be written as $$3M_g^2/2L_gL_q' = -[L_q' - L_q]/L_q' \quad (161)$$

Combining (158), (159) and (160) yields $$\lambda_q = [ (L_q/T'_{qo}L_q') + (d/dt) ] [ 2T'_{qo}L'_q\lambda_g/3M_g ] \quad (162)$$

Combining (157) and (161) gives $$2\lambda_g/3M_g = (L_q'i_q - \lambda_q)/(L_q' - L_q) \quad (163)$$

Combining (162) and (163) yields, after considerable manipulation, $$[1 + T'_{qo}(L_q'/L_q) (d/dt)] i_q = (1/L_q) [1 + T'_{qo}(d/dt)] \lambda_q \quad (164)$$

Equation (164) can be per-unitized through use of (70), (72), (115), (116) and (121) to yield $$[1 + \omega_BT'_{qo}(X'_{qpu}/X_{qpu}) (d/dt_{pu})] i_{qpu} = (1/X_{qpu}) [1 + \omega_BT'_{qo}(d/dt_{pu})] \lambda_{qpu} \quad (165)$$

Equation (165) represents the fundamental differential equation relating to per-unit values of $i_q$ and $\lambda_q$. It is important to note that the effects of the amortisseur are included in equation (165), even through no amortisseur variables are explicitly represented.

Finally, manipulation of equations (154) through (156) shows that these equations do indeed satisfy the rigorously derived equation (165). It is therefore concluded that equations (154) through (156) are suitable for characterizing the amortisseur variables in the present simulation of a linear alternator.

The present embodiments of this invention are to be considered in all respects as illustrative and not restrictive, the scope of the invention being indicated by the appended claims rather than by the foregoing description, and all changes which come within the meaning and range of equivalency of the claims therefore are intended to be embraced therein.

We claim:

1. In a method for simulating the dynamic electromechanical behavioral characteristics of a rotating electrical machine, said characteristics being the electromechanical response of the machine as a function of electrical and mechanical inputs thereto and the machine parameters, comprising providing input signals which represent said electrical and mechanical inputs to said machine, deriving a modulation signal representing the departure of the rotor of said machine from its normal rotational speed, modulating an oscillator with said modulation signal to generate electrical output signals which contain phase modulated sines and cosines about a carrier frequency which is the analog of the scheduled rotor speed of said machine and have a phase modulation which is the analog of a mechanical phase angle of the rotor of said machine, and demodulating certain of said input signals relative to said output signals from said oscillator to provide additional output signals which represent the amplitude and the sine and cosine of the relative phase angle between the electrical and mechanical variables of said machine, said additional output signals representing the stator phase-winding variable of said machine resolved into a reference frame fixed with respect to the rotor thereof.

2. A method as in claim 1 including applying said additional output signals through circuit means to derive said modulation signal as a feedback signal for said oscillator.

3. In a method for simulating the dynamic electromechanical behavioral characteristics of a rotating electrical machine, said characteristics being the electromechanical response of the machine as a function of electrical and mechanical inputs thereto and the machine parameters, comprising providing input signals which represent said electrical and mechanical inputs to said machine applying modulation signals to an oscillator which are derived from at least one signal which is the analog of a mechanical input to said machine causing said oscillator to generate electrical output signals which contain phase modulated sinusoids about a carrier frequency which is the analog of the scheduled rotor speed of said machine and have a phase modulation which is the analog of the mechanical phase angle of the rotor of said machine, demodulating at least one signal representing a stator electrical input to said machine with respect to said sinusoids, and deriving an additional output signal representing said stator electrical input signal referred to the rotor of said machine, deriving from said additional output signal, and at least one of said input signals representing a rotor variable of said machine, interaction signals representing the electrical and mechanical interaction of said machine, one of said interaction signals being representative of the departure of the rotor of said machine from its normal rotational speed and being applied as the modulation signal to said oscillator.

4. In a method for simulating dynamic electromechanical behavioral characteristics of a rotating electrical machine by applying electrical signals to a simulation system, said characteristics being the electromechanical response of the machine as a function of electrical and mechanical inputs thereto and the machine parameters, comprising providing electrical signals representing rotating electrical machine variables from groups of rotating electrical machine variables, said groups of variables comprising (a) stator voltage and current, (b) rotor field voltage and current, and (c) rotor torque and speed, applying to said system, which includes oscillator and demodulator circuit means, electrical signals representing one variable from each of said groups (a), (b) and (c) of variables, and deriving from said system electrical signals as outputs which are the other variables from said groups (a), (b) and (c) of variables.

5. In a method as in claim 4 wherein said variables are alternator variables, and said system includes a plurality of said circuit means interconnected therein, and input signals are applied to said system representing variables of a plurality of interconnected alternators for simulating the dynamic electromechanical behavioral characteristics of a plurality of alternators.

6. In a method for simulating a rotating electrical machine through the application of input signals to a system including interconnected coordinate transformation means and electronic circuit means comprising providing input signals representative of electrical and mechanical inputs supplied to said machine by mechanical and electrical connections exterior to said machine, applying said input signals to said system including interconnected coordinate transformation means and electronic circuit means, and generating electrical signals which represent variables of said electrical machine, and deriving from said system electrical signals indicative of resultant operational behavior of said machine in the form of electromechanical response thereof to said electrical and mechanical inputs and parameters of said machine.

7. In a method as in claim 6 wherein said coordinate transformation means includes an oscillator, and said oscillator is modulated as a function of a mechanical input to said machine and generates electrical signals which contain information pertaining to trigonometric functions of the angle of the rotor of said machine relative to a fixed reference frame.

8. In a method as in claim 7 wherein said coordinate transformation means further includes a demodulator, and the output of said oscillator is applied as a reference input to said demodulator, and said input signals to said system include signals representing a stator electrical variable of said machine and are applied to said demodulator.

9. In a method as in claim 6 wherein said input signals represent machine variables from groups of machine variables, said groups of variables comprising, (a) stator voltage and current, (b) rotor field voltage and current, and (c) rotor torque and speed, input signals representative of one variable from each of said groups (a), (b), and (c) of variables are applied to said system, and said electrical signals derived from said system are the other variables from said groups (a), (b), and (c) of variables.

10. In a method for simulating the dynamic electromechanical behavioral characteristics of a rotating electrical machine utilizing a new use of a phase-locked-loop circuit, said characteristics being the electromechanical response of the machine as a function of electrical and mechanical inputs thereto and the machine parameters, comprising the steps of providing electrical input signals indicative of electrical and mechanical inputs to the rotating electrical machine, deriving additional signals from said input signals, applying said additional signals to a phase-locked-loop circuit, said phase-locked-loop circuit comprising an interconnected oscillator, demodulator and feedback circuit, certain of said additional signals being applied to said oscillator and to said demodulator, and deriving from said phase-locked-loop circuit output signals for providing an indication of the behavioral characteristics of said machine.

11. In a method for simulating the dynamic electromechanical behavioral characteristics of a rotating electrical machine utilizing a new use of an oscillator and demodulator circuit as a rotating coordinate transformer, said characteristics being the electromechanical response of the machine as a function of electrical and mechanical inputs thereto and the machine parameters, comprising the steps of providing electrical input signals indicative of electrical and mechanical inputs to the rotating electrical machine, deriving additional signals from said input signals, applying said additional signals to an interconnected oscillator and demodulator circuit forming a rotating coordinate transformer, certain of said additional signals being applied to the oscillator and to the demodulator of said circuit, and deriving from said circuit output signals for providing an indication of the behavioral characteristics of said machine.

12. A method as in claim 11 wherein the modulation input of said oscillator of said circuit is derived from signals representing mechanical data of said machine, the signals applied to the demodulator of said circuit are derived from signals representing electrical data of said machine, and said output signals are derived from said demodulator.

13. In a method for simulating the rotation of the rotor of an electrical machine comprising providing an input signal representing the departure of said rotor from its normal rotational speed, and modulating an oscillator with said input signal, said oscillator having a center frequency which represents the normal rotational speed of said rotor, thereby generating from said oscillator an electrical signal which contains a sinusoid of the angle between a fixed reference frame and the reference frame of the rotor of said machine.

14. In a method as in claim 13 further simulating the transformation of an electrical variable in the reference frame of the stator of said electrical machine to the reference frame of the rotor thereof, comprising providing a second input signal representing said stator electrical variable, applying said second input signal as an input to a demodulator, applying the output of said oscillator as a reference signal to said demodulator, and deriving as the output from said demodulator an electrical signal representing the transformation of said stator electrical variable to said rotor.

15. In a method as in claim 13 further simulating the transformation of an electrical variable in the reference frame of said rotor to the reference frame of the stator of said electrical machine, comprising generating a second input signal representing said rotor electrical variable, applying said second input signal as an input to a demodulator, applying the output of said oscillator as a reference signal to said demodulator, and deriving as the output from said demodulator an electrical signal representing the transformation of said rotor electrical variable to said stator.

16. In a method as in claim 14 wherein interaction between the rotor and stator electrical variables is simulated wherein said input signal representing the departure of said rotor from its normal rotational speed is generated in response to the output of said demodulator and applied as feedback to said oscillator for providing the modulating signal for said oscillator.

17. In a method as in claim 14 wherein interaction between the rotor and stator electrical variables is simulated wherein said input signal representing the departure of said rotor from its normal rotational speed is generated in response to the output of said demodulator by circuit means and is applied as feedback to said oscillator to cause said oscillator and demodulator to function as a phase-locked-loop.

18. In a simulation system for simulating dynamic electromechanical behavioral characteristics of an electrical alternator, comprising modulated oscillator means for modulating the signals applied thereto with respect to a center frequency and providing a reference output, demodulator means for demodulating input signals applied thereto and receiving said reference output of said oscillator means, a plurality of computing components interconnecting said oscillator and demodulator to form a computational circuit, means coupled with said circuit for applying electrical input signals thereto indicative of electrical and mechanical inputs to said alternator imposed by mechanical and electrical connections external to said alternator, and means coupled with said circuit for deriving therefrom electrical signals which are a function of said input signals and indicative of resulting electromechanical behavioral characteristic response of said alternator.

19. In a system as in claim 18 wherein
said oscillator means comprises a voltage controlled oscillator,
said demodulator means comprises a phase detector,
said computing components comprise first and second amplifiers and first and second multipliers,
said phase detector having an output coupled as an input to the first of said amplifiers and to the first of said multipliers, said first amplifier having an output coupled to the second of said multipliers, and
said multipliers having outputs coupled to the second of said amplifiers which has an output coupled to said voltage controlled oscillator for applying modulating signals thereto.

20. In a system as in claim 19 wherein
said computing components further include third and fourth amplifiers,
the output of said phase detector is coupled as an input to said third amplifier, the output of which is coupled to said fourth amplifier, and
the output of said fourth amplifier is coupled as an input to said first and third amplifiers.

21. In a system as in claim 20 wherein
said means for applying electrical input signals to said system include a plurality of signal input terminals, a first of which is coupled through another amplifier to an input of said phase detector, a second of which is coupled as an input to said fourth amplifier, and a third of which is coupled as an input to said second amplifier.

22. In a system as in claim 18 wherein
said oscillator means comprises a voltage controlled oscillator,
said demodulator means comprises first and second phase detectors, and
said computing components comprise a plurality of amplifiers and multipliers interconnected with said first and second phase detectors and said voltage controlled oscillator to form two phase-locked-loops, both of said loops including said voltage controlled oscillator.

23. In a system as in claim 22 wherein
the first of said phase-locked-loops includes said first phase detector, said voltage controlled oscillator, first and second amplifiers, and first and second multipliers, said first phase detector having an output coupled as an input to the first of said amplifiers and to the first of said multipliers, said first amplifier having an output coupled to the second of said multipliers,
the second of said phase-locked-loops includes said second phase detector, said voltage controlled oscillator, said second amplifier, said first and second multipliers, and a third amplifier, said second phase detector having an output coupled as an input to said third amplifier and to the second multiplier, and said third amplifier having an output coupled to said first multiplier, and
said multipliers having outputs coupled to said second amplifier which has an output coupled to said voltage controlled oscillator for applying modulating signals thereto, and
said voltage controlled oscillator has an output applied as a reference input to each of said first and second phase detectors.

24. In a system as in claim 23 including
fourth and fifth amplifiers coupled with said first phase-locked-loop, the output of said first phase detector being coupled as an input to said fourth amplifier, the output of which is coupled to said fifth amplifier, and the output of said fifth amplifier being coupled as an input to said first and fourth amplifiers, and
sixth and seventh amplifiers coupled with said second phase-locked-loop, the output of said second phase detector being coupled as an input to said sixth amplifier, the output of which is coupled to said seventh amplifier, and the output of said seventh amplifier being coupled as an input to said third and sixth amplifiers.

25. In a system as in claim 24 wherein
said means for applying electrical input signals to said system include a plurality of signal input terminals, a first of which is coupled through another amplifier to an input of said first and second phase detectors, a second of which is coupled as an input to said fifth amplifier, and a third of which is coupled as an input to said second amplifier.

26. In a simulation system as in claim 25 wherein
said means coupled with said system for deriving therefrom electrical signals which are a function of said input signals includes multiplier and amplifier means coupled with the output of said voltage controlled oscillator, and includes an output terminal of said second amplifier and an output terminal of said fourth amplifier.

27. In a system for simulating the dynamic electromechanical behavioral characteristics of a rotating electrical machine comprising
means for supplying a plurality of electrical input signals, said electrical input signals being representative of electrical and mechanical inputs supplied to said machine by mechanical and electrical connections exterior to said machine,
phase-locked-loop circuit means for receiving and processing said plurality of electrical input signals and for providing an analog simulation of the electromechanical response of said machine, said phase-locked-loop circuit means including an oscillator and demodulator, both of which receive additional signals which are derived from certain of said electrical input signals, and
means for deriving from said phase-locked-loop circuit means electrical output signals indicative of the resulting behavioral characteristics of said machine in the form of the electromechanical response thereof to said electrical and mechanical inputs and parameters of said machine.

28. In a system as in claim 27 wherein
said oscillator has a center frequency which is representative of the normal rotor speed of said machine, said oscillator being coupled to said demodulator for providing a reference signal output to said demodulator, said electrical input signals including a variable signal representing a coordinate in a primary reference frame, said primary reference frame corresponding to the rotating electromagnetic field of the stator of said machine, said variable signal being supplied to said demodulator resulting in an additional output signal representing a variable in a secondary reference frame of said machine, said secondary reference frame representing the rotor of said machine, and feedback circuit means for receiving said additional output signal and providing a modulation signal for said oscillator.

29. In a system as in claim 28 wherein said demodulator includes a phase detector, and said feedback circuit means includes amplifier and multiplier circuit means for receiving said additional output signal from said demodulator and supplying said modulation signal to said oscillator.

30. In a system as in claim 29 wherein said amplifier and multiplier circuit means comprises first and second amplifiers and first and second multipliers, said phase detector having an output coupled as an input to the first of said amplifiers and the first of said multipliers, said first amplifier having an output coupled to the second of said multipliers, and said multipliers having outputs coupled to the second of said amplifiers which has an output coupled to said oscillator for applying modulating signals thereto.

31. A rotating coordinate transformer for calculating the transformation of coordinates between a primary reference frame and a secondary reference frame which rotate relative to each other and at least one of which rotates with respect to a fixed reference frame, comprising means for supplying an input signal representing the departure of rotation of the secondary reference frame from its normal rotational speed, modulated oscillator means responsive to said input signal for generating an electrical signal which contains information pertaining to sines and cosines of the angle between the secondary reference frame and the fixed reference frame, said oscillator means generating a center frequency which is representative of the normal rotational speed of said secondary reference frame with respect to said fixed reference frame, means for supplying a signal representing a coordinate in said primary reference frame, and demodulator means having a reference input derived from an output of said oscillator means, and said demodulator means having as an additional input said signal representing a coordinate in said primary reference frame, and providing an output representing the same coordinate transformed to said secondary reference frame.

32. A rotating coordinate transformer as in claim 31 wherein said modulated oscillator means is a voltage controlled oscillator, and said demodulator means is a phase detector.

33. A rotating coordinate transformer for calculating the transformation of coordinates between a primary reference frame and a secondary reference frame which rotate relative to each other and at least one of which rotates with respect to a fixed reference frame, comprising means for supplying an input signal representing the departure of rotation of the secondary reference frame from its normal rotational speed, said secondary reference frame being the reference frame of the rotor of a rotating electrical machine, modulated oscillator means responsive to said input signal for generating an electrical signal which contains information pertaining to sines and cosines of the angle between the secondary reference frame and the fixed reference frame, said fixed reference frame being exterior to said machine, said oscillator means generating a center frequency which represents the normal rotational speed of said secondary reference frame with respect to said fixed reference frame, means for supplying a signal representing a coordinate in said primary reference frame, said primary reference frame corresponding to the rotating magnetic field generated by the stator of said machine, and demodulator means having a reference input derived from an output of said oscillator means, and said demodulator means having as an additional input said signal representing a coordinate in said primary reference frame, and providing an output representing the same coordinate transformed to said secondary reference frame.

34. A rotating coordinate transformer comprising means for supplying a modulation signal representing the departure of a rotating reference frame of a rotating electrical machine from its normal rotational speed, modulated oscillator means responsive to said input signal for generating an electrical signal which contains information pertaining to the sines and cosines of the angle between the rotating reference frame of said rotating electrical machine and a fixed reference frame, said oscillator means having a center frequency which is an analog of the scheduled rotational speed of said rotating reference frame, means for supplying a signal representing a primary reference frame coordinate, and demodulator means having a reference input derived from an output of said oscillator means, and said demodulator means having as an additional input said signal representing a primary reference frame coordinate, and providing an output representing a secondary reference frame coordinate.

35. A coordinate transformer as in claim 34 wherein said rotating reference frame is a secondary reference frame representative of the rotor of said rotating electrical machine.

36. A coordinate transformer as in claim 34 wherein the coordinate transformation is computed according to the Park coordinate transformation and wherein said rotating reference frame corresponds to the rotor of said machine as a secondary reference frame, and said additional input signal represents a coordinate in the primary reference frame of the rotating electromagnetic field of the stator of said machine.

* * * * *